US012606467B2

(12) United States Patent
Sasaki et al.

(10) Patent No.:   US 12,606,467 B2
(45) Date of Patent:        Apr. 21, 2026

(54) WATER TREATMENT METHOD AND WATER TREATMENT APPARATUS

(71) Applicant: ORGANO CORPORATION, Tokyo (JP)

(72) Inventors: Keisuke Sasaki, Tokyo (JP); Mayu Abe, Tokyo (JP); Fumio Sudo, Tokyo (JP); Hiroshi Yamada, Tokyo (JP); Tsukasa Kondo, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 344 days.

(21) Appl. No.: 18/280,737

(22) PCT Filed: Feb. 3, 2022

(86) PCT No.: PCT/JP2022/004236
§ 371 (c)(1),
(2) Date: Sep. 7, 2023

(87) PCT Pub. No.: WO2022/190727
PCT Pub. Date: Sep. 15, 2022

(65) Prior Publication Data
US 2024/0239695 A1        Jul. 18, 2024

(30) Foreign Application Priority Data

Mar. 10, 2021   (JP) ................................. 2021-038310
Mar. 10, 2021   (JP) ................................. 2021-038311

(51) Int. Cl.
*B01D 61/46*        (2006.01)
*B01D 61/48*        (2006.01)
(Continued)

(52) U.S. Cl.
CPC .......... *C02F 1/4695* (2013.01); *B01D 61/463* (2022.08); *B01D 61/485* (2013.01); *C02F 1/725* (2013.01); *C02F 2101/10* (2013.01)

(58) Field of Classification Search
CPC ..... B01D 61/48; B01D 61/485; C02F 1/4695; C02F 1/58; C02F 1/70
See application file for complete search history.

(56) References Cited

U.S. PATENT DOCUMENTS

2009/0127201 A1      5/2009  Kobayashi

FOREIGN PATENT DOCUMENTS

CN          104341029 A        2/2015
CN          108137354 A        6/2018
(Continued)

OTHER PUBLICATIONS

Shibasaki, Kenji et al—CN 108137354A machine translation—Jun. 8, 2018 (Year: 2018).*
(Continued)

*Primary Examiner* — Bradley R Spies
(74) *Attorney, Agent, or Firm* — GREENBLUM & BERNSTEIN, P.L.C.

(57)        ABSTRACT

___ A water treatment apparatus for removing dissolved oxygen contained in water to be treated includes: an anode; a cathode; and a dissolved oxygen removal chamber which is located between the anode and the cathode and filled with an ion exchanger. At least a portion of the ion exchanger filled in the dissolved oxygen removal chamber is an ion exchanger on which a metal catalyst is supported. The ion exchanger on which the metal catalyst is supported is filled in a single bed configuration in at least a portion of the dissolved oxygen removal chamber. A DC current is applied between the anode and the cathode.

18 Claims, 12 Drawing Sheets

(51) Int. Cl.
    *C02F 1/469*       (2023.01)
    *C02F 1/72*        (2023.01)
    *C02F 101/10*     (2006.01)

(56)          References Cited

FOREIGN PATENT DOCUMENTS

| | | | |
|---|---|---|---|
| JP | 5-96283 | A | 4/1993 |
| JP | 6-320165 | A | 11/1994 |
| JP | 7-241569 | A | 9/1995 |
| JP | 10-272474 | A | 10/1998 |
| JP | 2003-94064 | A | 4/2003 |
| JP | 2003-190961 | A | 7/2003 |
| JP | 2007-185587 | A | 7/2007 |
| WO | 2018/117035 | A1 | 6/2018 |

OTHER PUBLICATIONS

Koizumi, Motomu—JP 10272474 machine translation—Oct. 13, 1998 (Year: 1998).*

Sato, Shin et al—JP 2003094064 machine translation—Apr. 2, 2003 (Year: 2003).*

Office Action dated Dec. 3, 2024 in Japanese family member patent application No. 2021-38311, with an English language translation thereof.

Office Action, sated May 29, 2025, in Chinese family member application No. 202280020285.8 with English language translation thereof.

International Search Report issued Apr. 5, 2022 in International Bureau of WIPO Patent Application No. PCT/JP2022/004236 with an English translation thereof.

Written Opinion issued Apr. 5, 2022 in International Bureau of WIPO Patent Application No. PCT/JP2022/004236 with an English translation thereof.

\* cited by examiner

[FIG. 1]
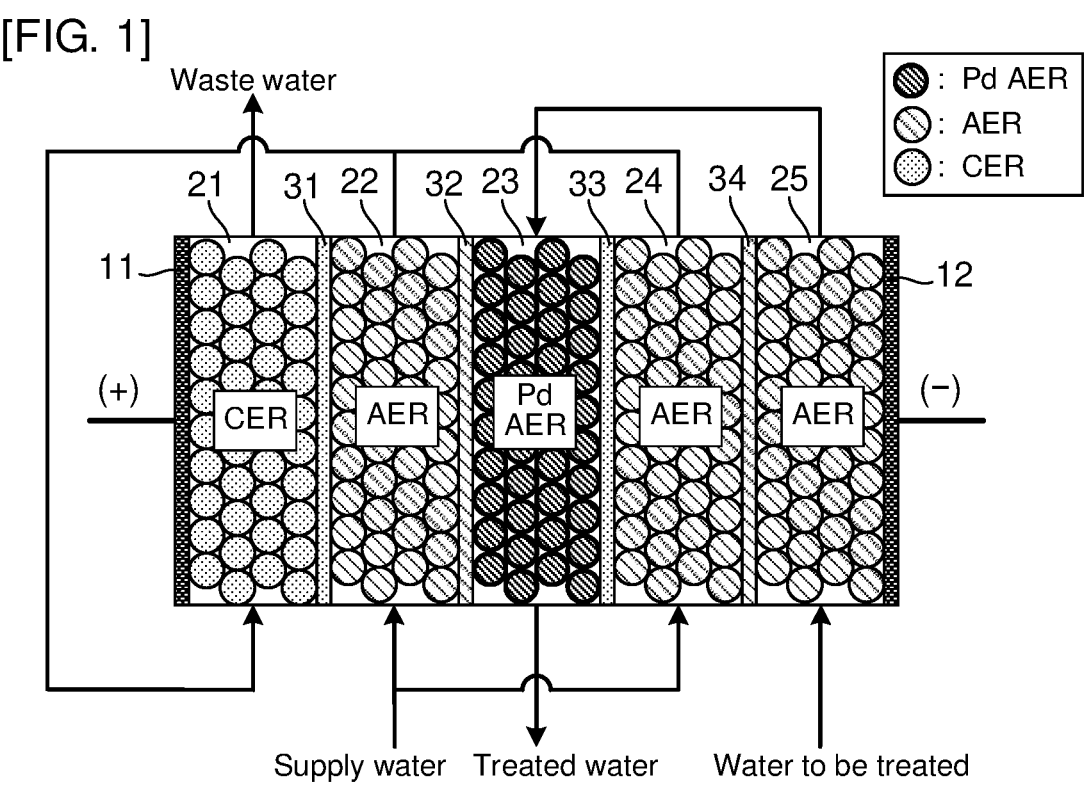
[FIG. 2]
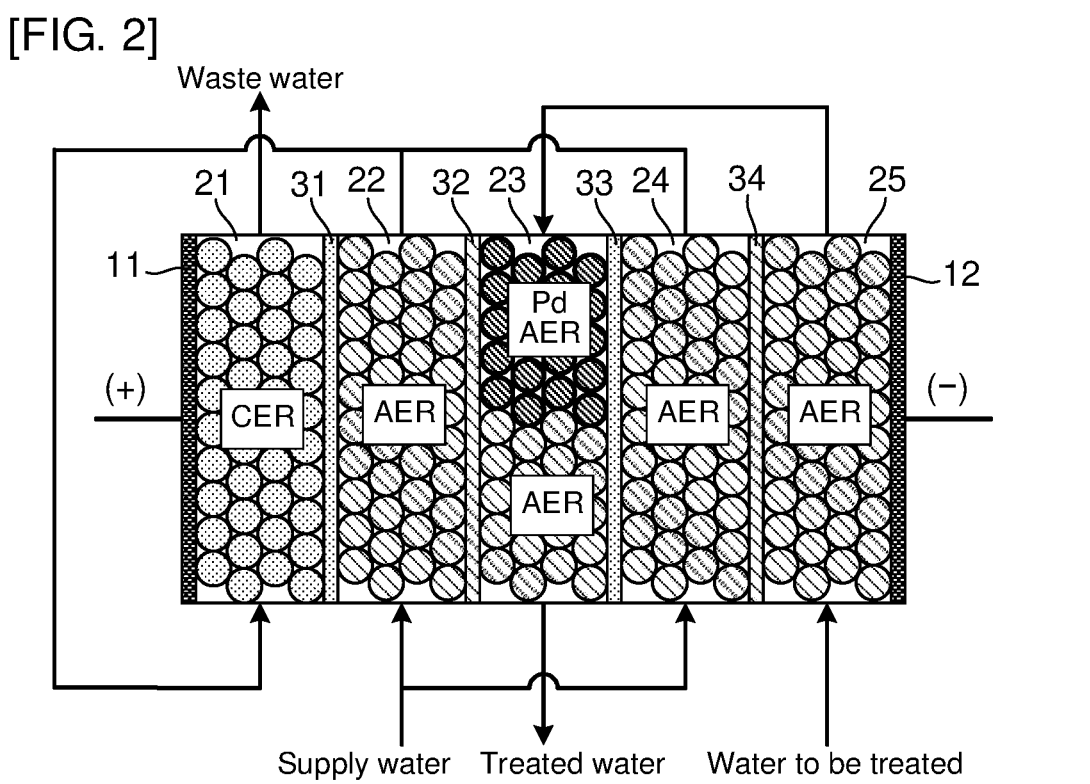

[FIG. 3]
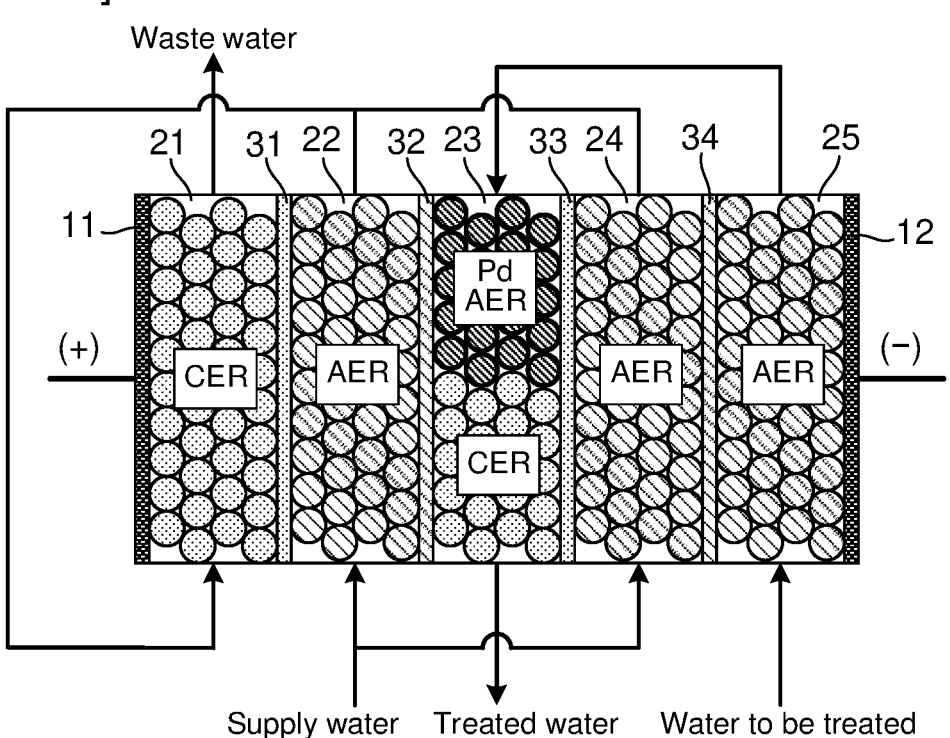
[FIG. 4]

[FIG. 5A]
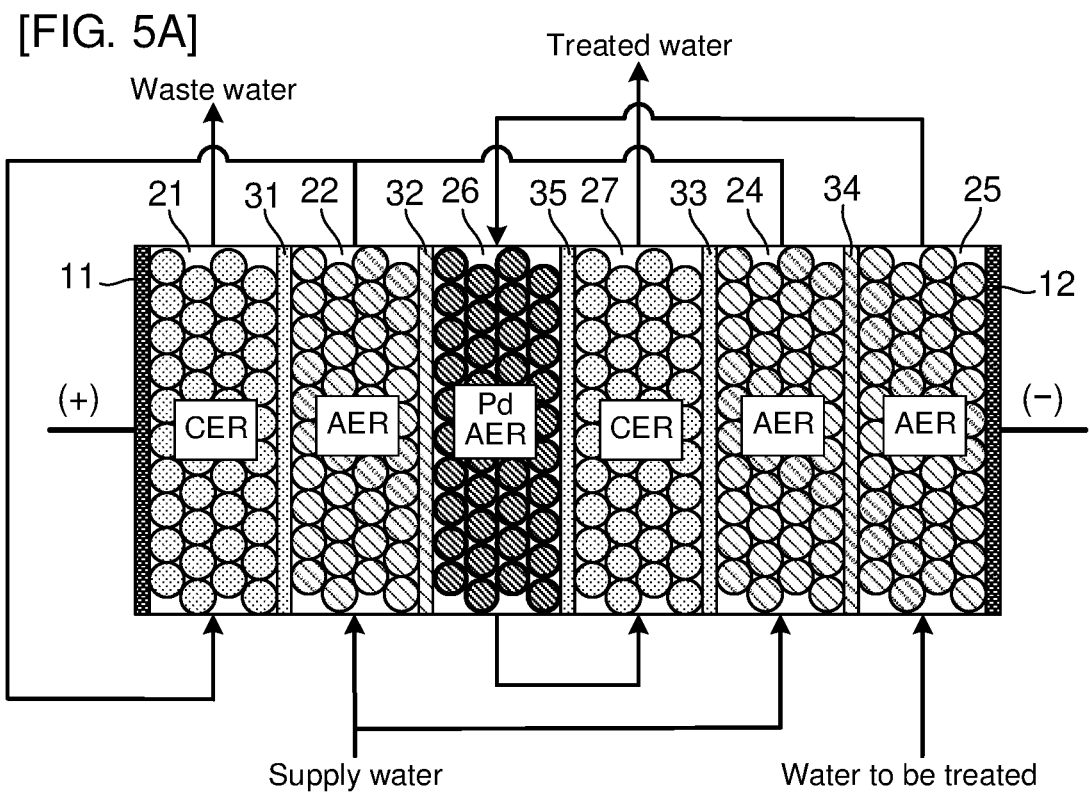
[FIG. 5B]
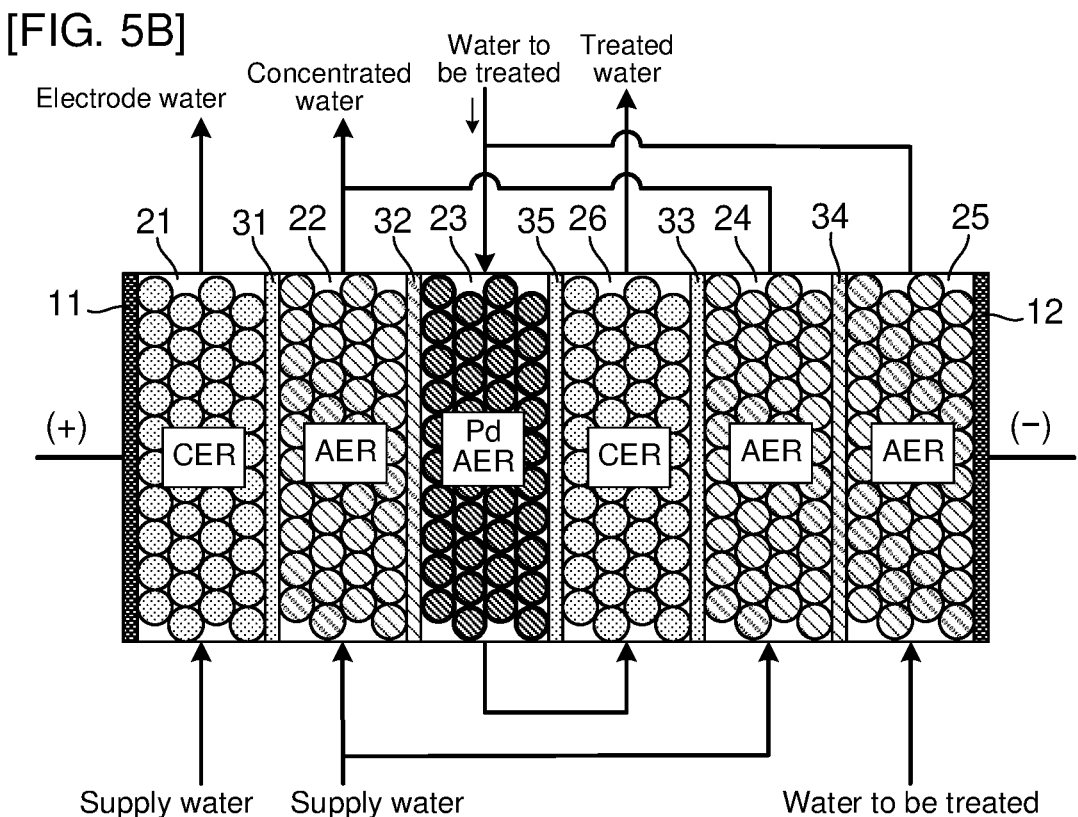

[FIG. 5C]
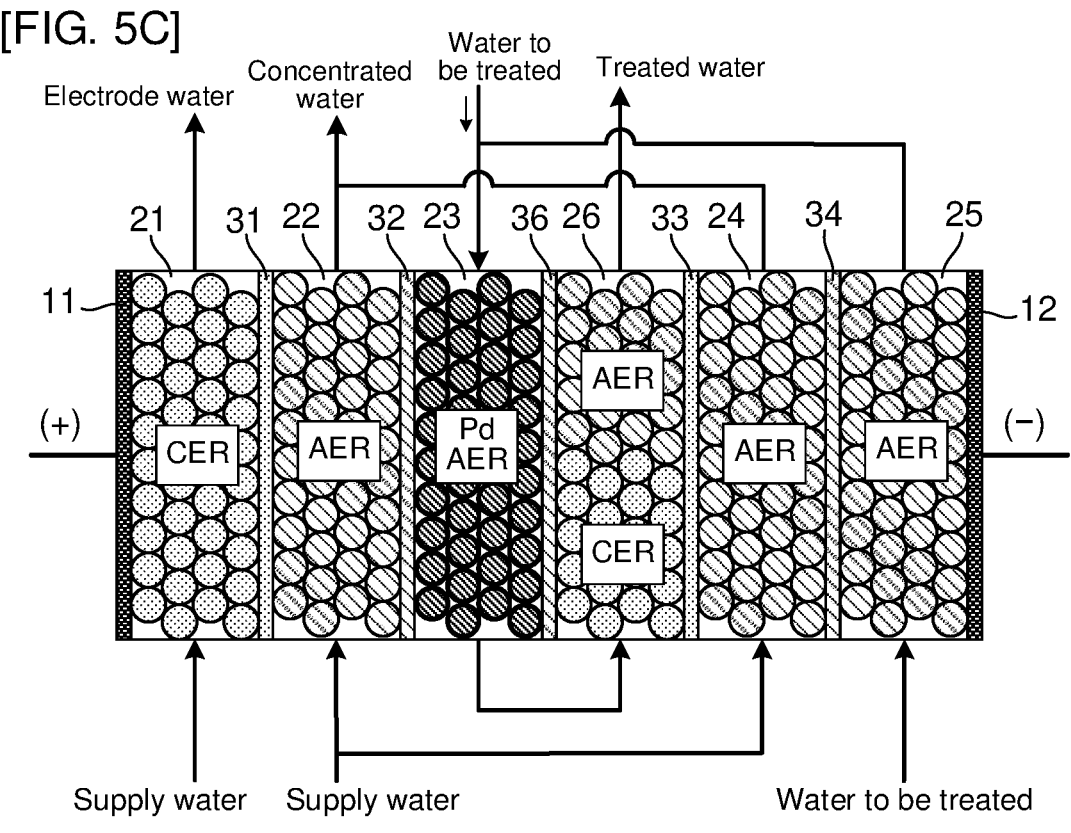
[FIG. 6A]

[FIG. 6B]
Electrode water    Concentrated    Water to be treated
                   water
          31      32      33          32      33      34
11                                                              12
(+)    CER    AER    Pd     AER  ...  Pd     AER    AER    (−)
                     AER                AER
21    22    23          24          23    24    25
Supply water    Supply water    Deionized water    Water to be treated
[FIG. 7]
Waste water ←    Supply water
          21    31   24    34      25
11                                      12
(+)    CER    AER    Pd     (−)
                     AER
                Water to    Treated
                be treated   water
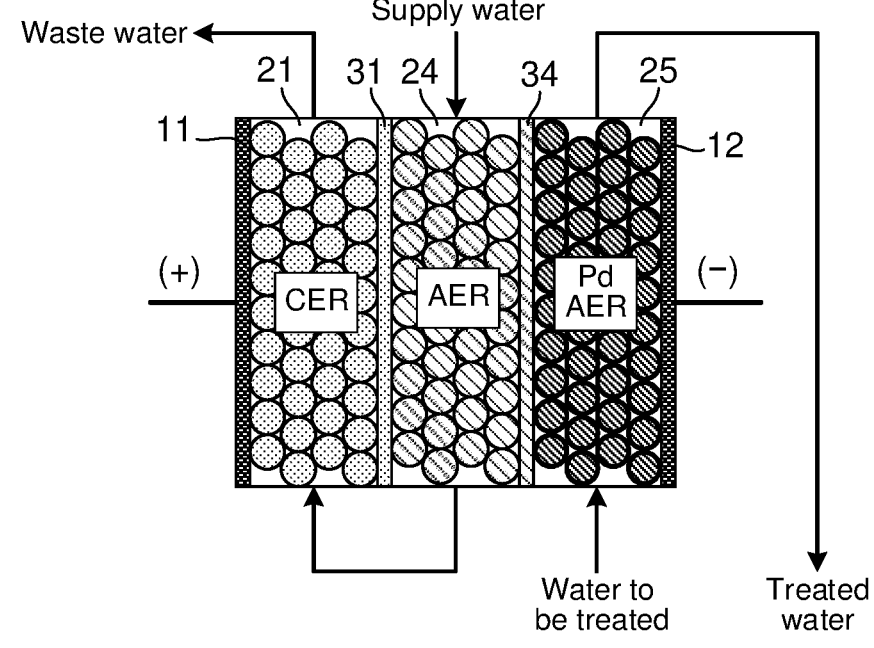

[FIG. 8]
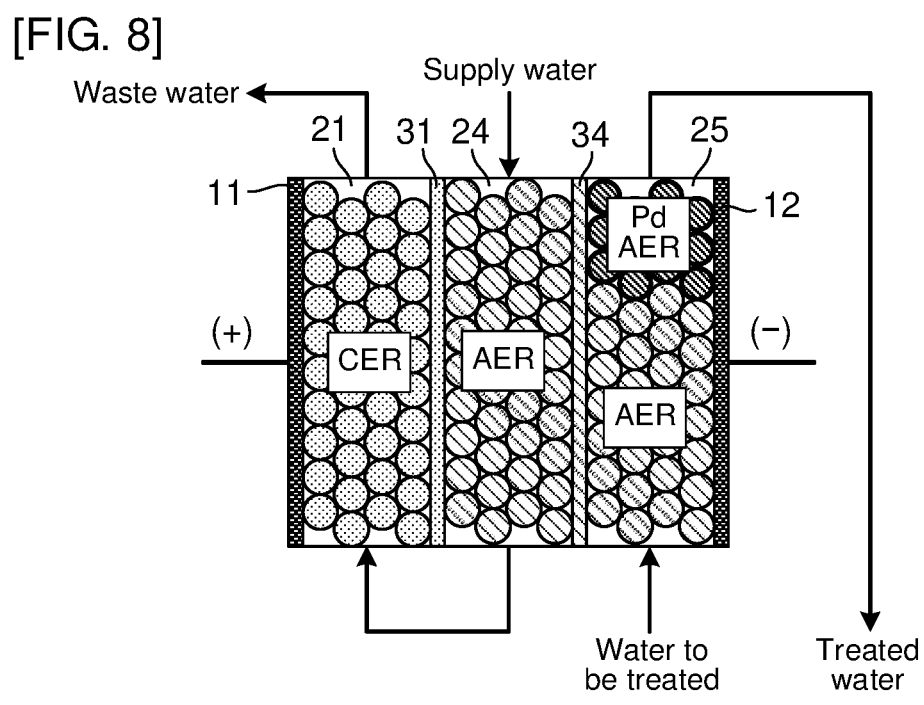
[FIG. 9]
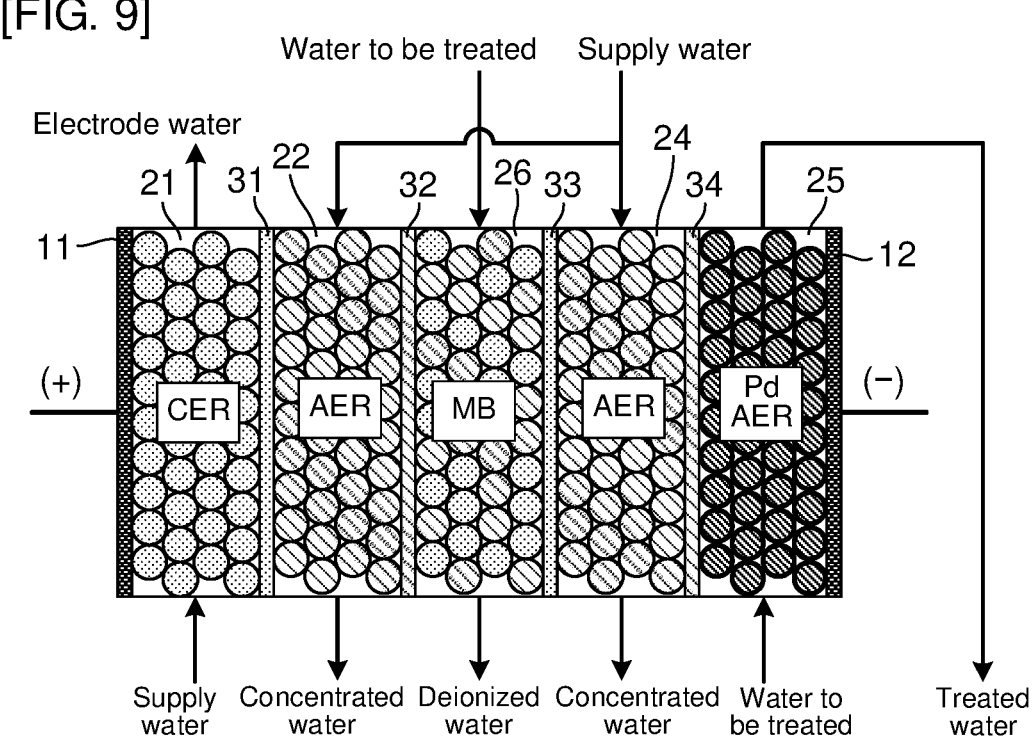

[FIG. 10]
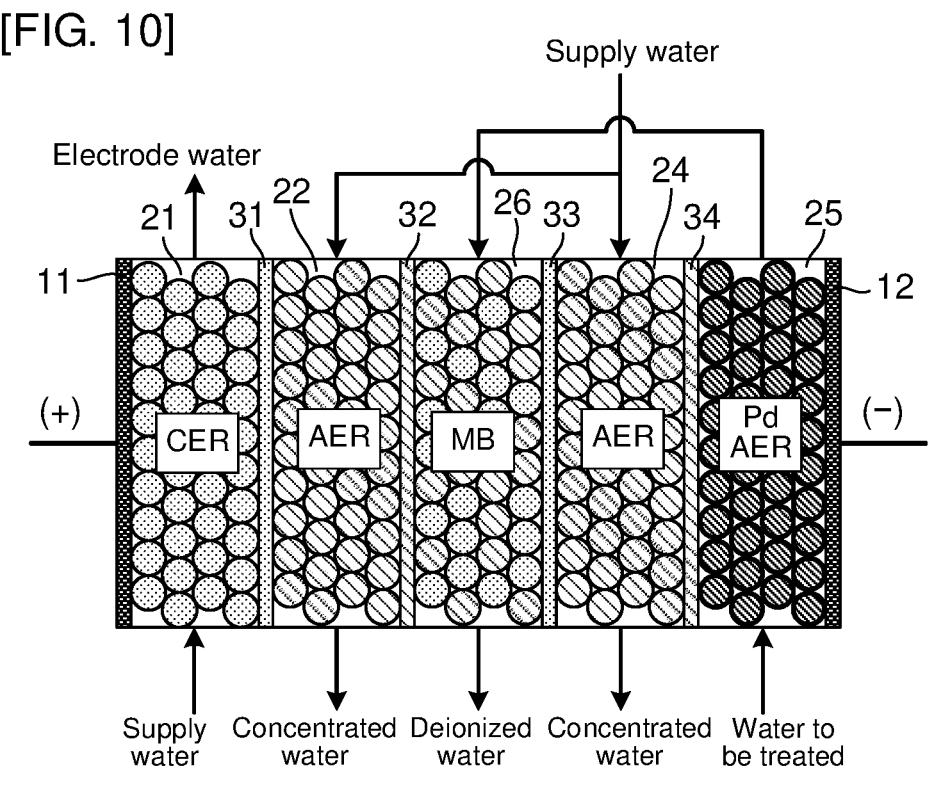
[FIG. 11]
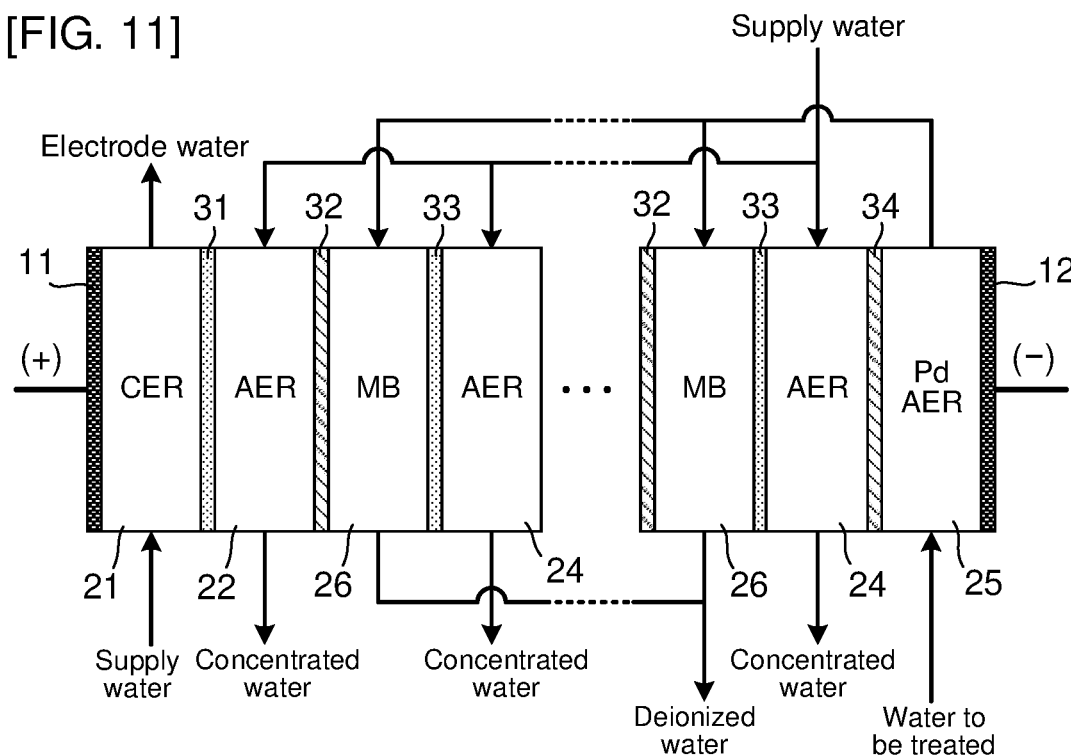

[FIG. 12]
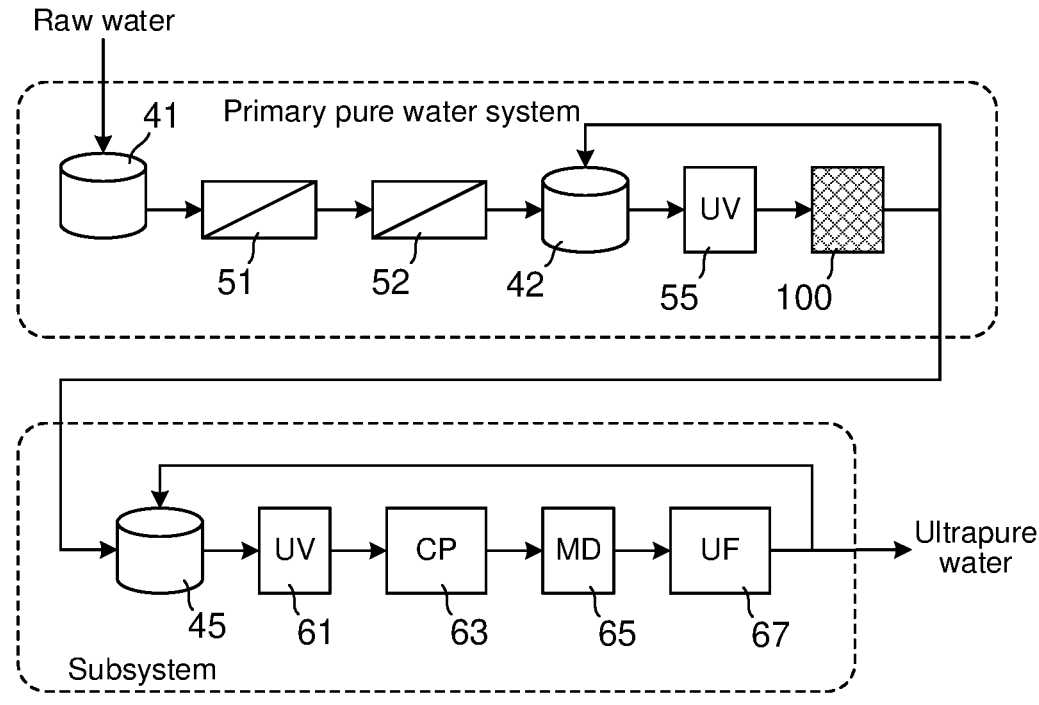
[FIG. 13]
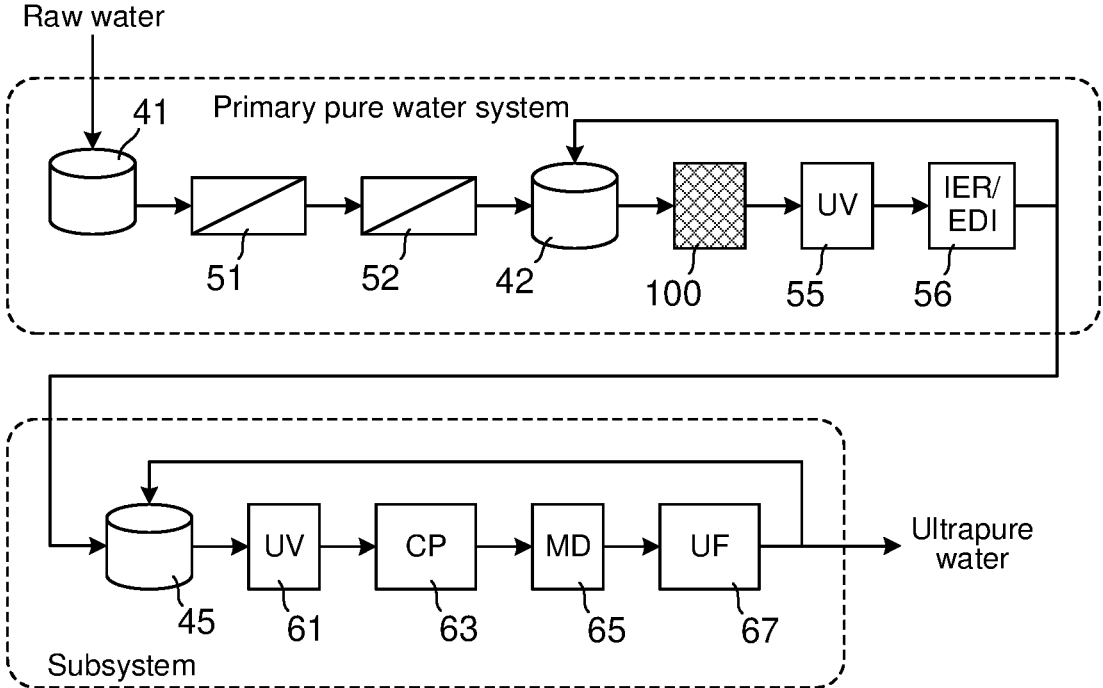

[FIG. 14]
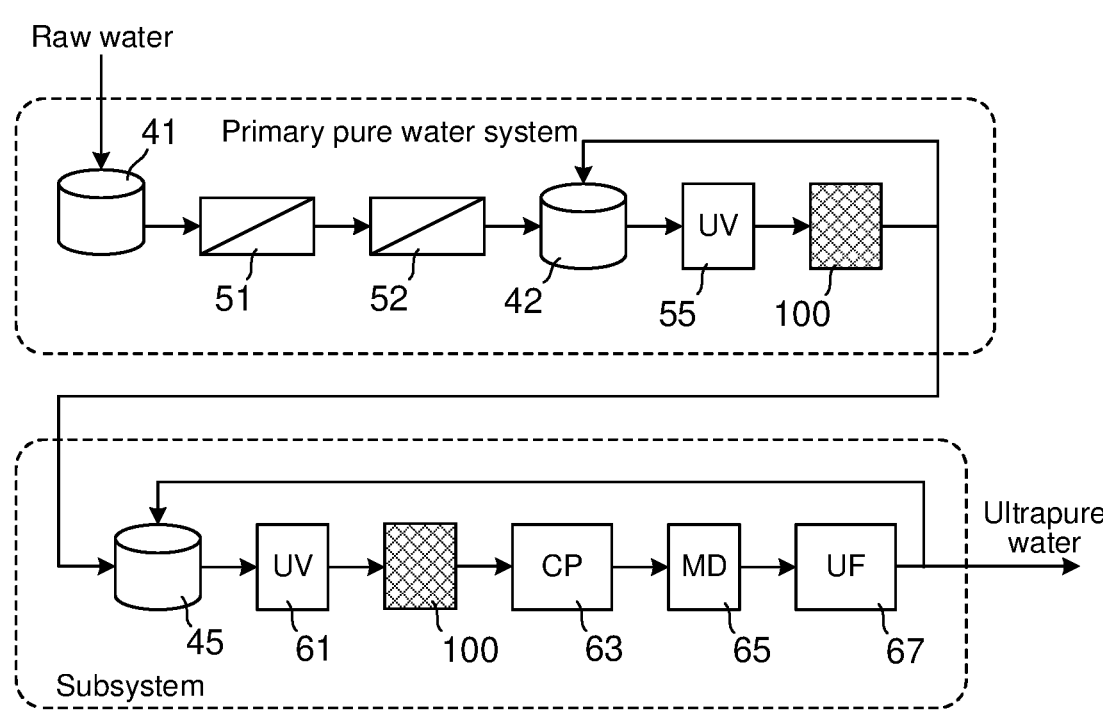
[FIG. 15]

[FIG. 16]
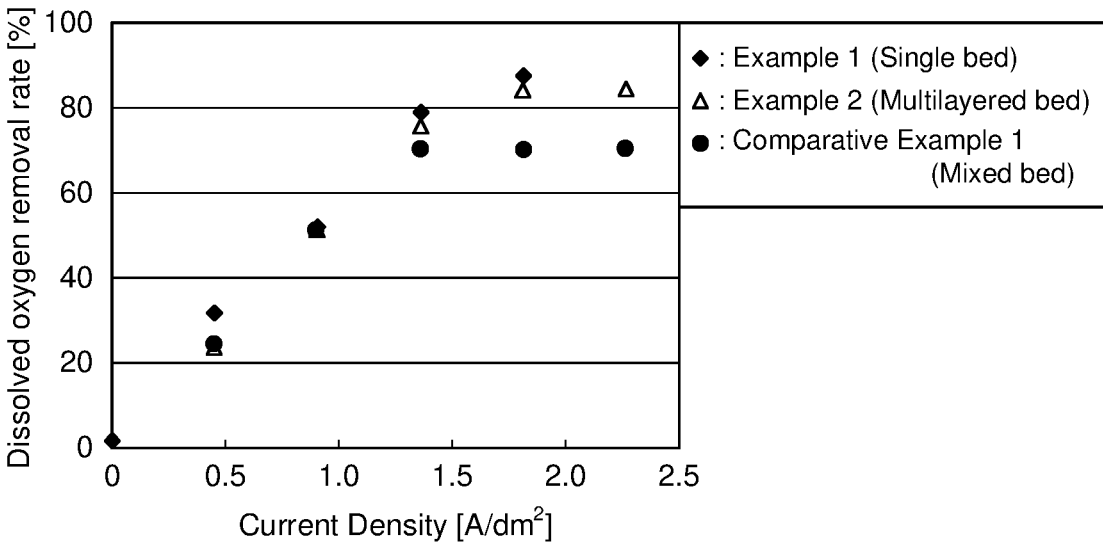
[FIG. 17]
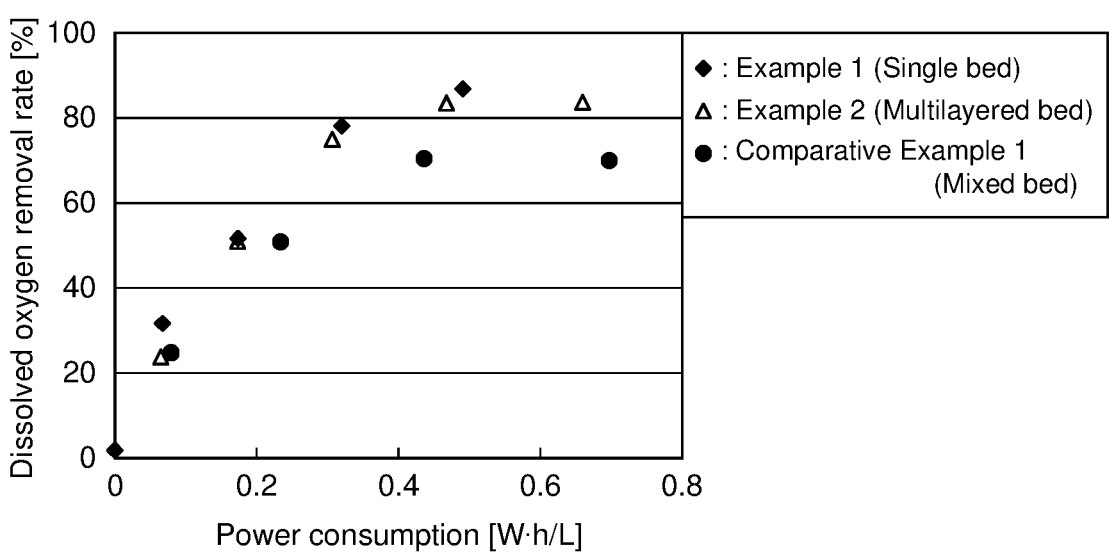

[FIG. 18]
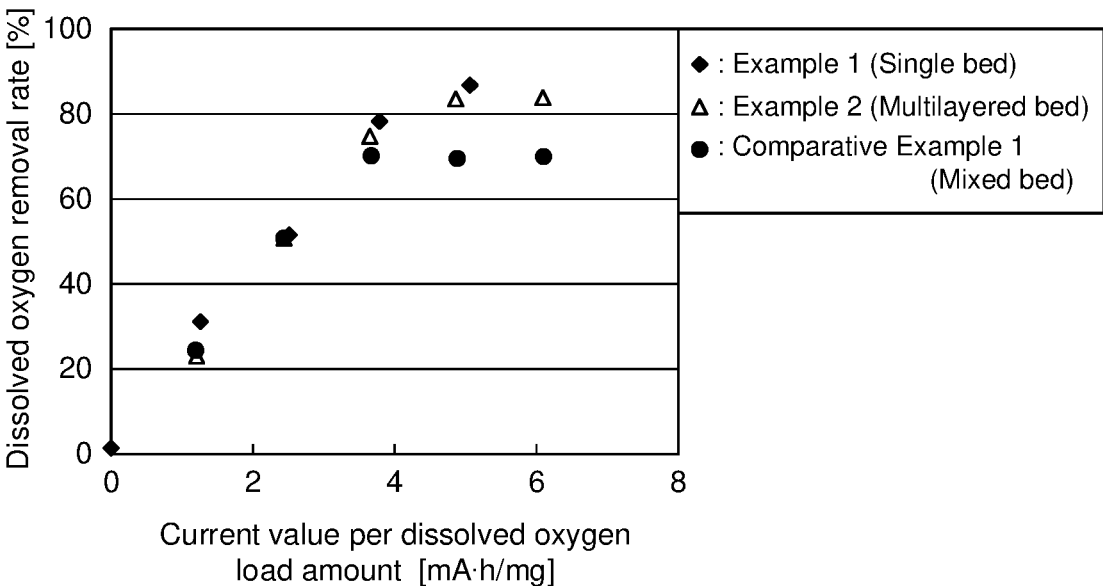
[FIG. 19]
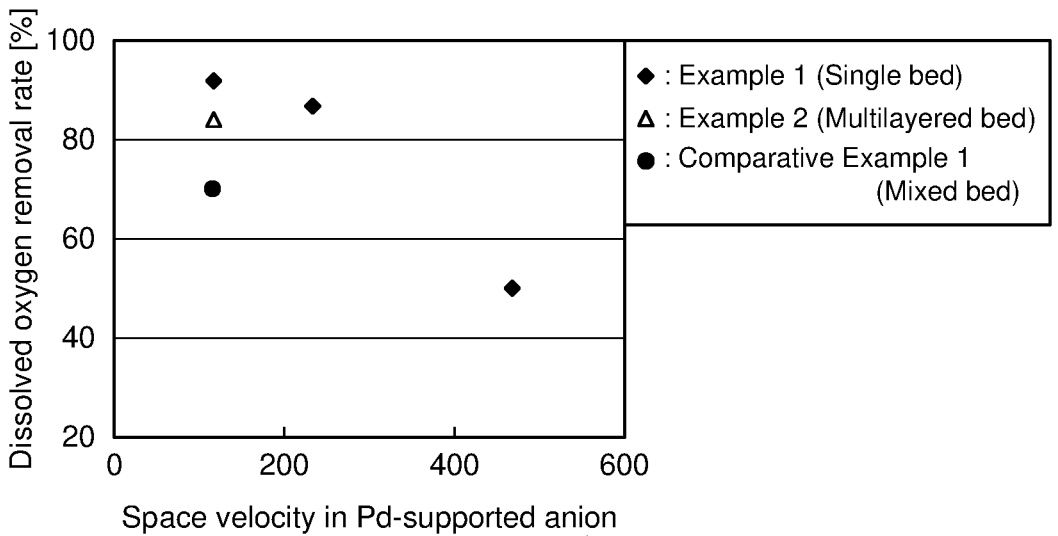

[FIG. 20]
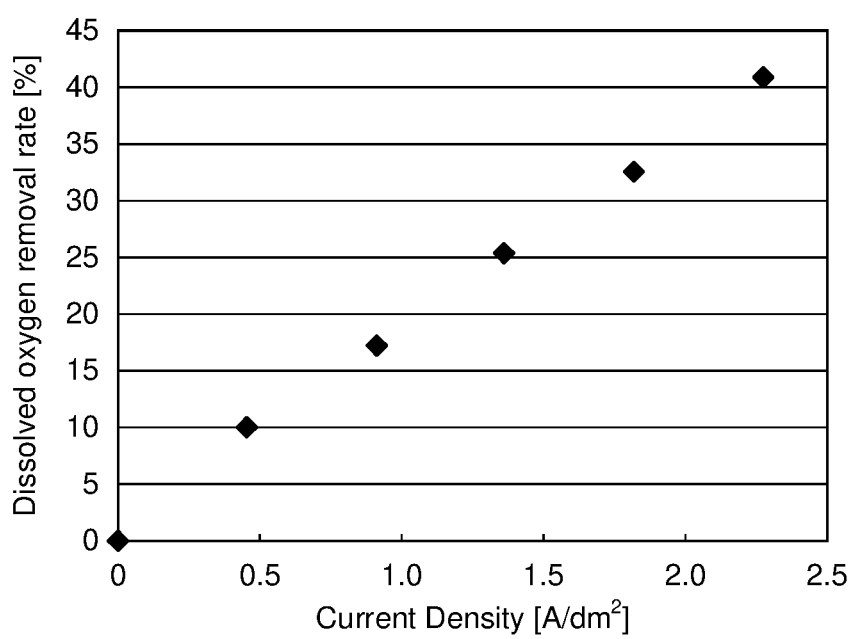

WATER TREATMENT METHOD AND WATER TREATMENT APPARATUS

TECHNICAL FIELD

The present invention relates to a water treatment apparatus and a water treatment method that can remove dissolved oxygen and the like in water.

BACKGROUND ART

A membrane degassing method using a degassing membrane is well known as a method for removing dissolved oxygen in water to be treated when the water to be treated is processed to produce pure water or the like. However, in the membrane degassing method, it is necessary to maintain the degree of vacuum on the gas phase side opposite to the water to be treated with the degassing membrane interposed therebetween, which requires installation of a vacuum pump or the like. Therefore, a method of removing dissolved oxygen has been put to practical use in which a reducing agent such as hydrogen or hydrazine is added to water to be treated and then the water to be treated is brought into contact with a deoxygenation catalyst supporting palladium or the like thereby advancing a reaction to produce water from dissolved oxygen and hydrogen (or hydrazine). An example of the removal of dissolved oxygen by contacting a deoxygenation catalyst in the presence of hydrogen is disclosed in Patent Literature 1. Patent Literature 2 discloses that an electrolytic bath in which a cathode chamber and an anode chamber are partitioned by a solid polymer electrode membrane is used, electrolysis of water is advanced while the water to be treated is supplied to the cathode chamber, dissolved oxygen is reduced and removed by a cathodic reaction in the cathode chamber, and then the dissolved oxygen that could not be removed is removed by bringing the dissolved oxygen into contact with a dehydrogenation catalyst together with the hydrogen generated by the electrolysis.

By the way, there is an electrodeionization (EDI) device as one of devices to produce deionized water from water to be treated. The EDI device is a device in which electrophoresis and electrodialysis are combined, and at least the deionization chamber thereof is filled with an ion exchange resin. The EDI device has the advantage of eliminating the need for the process of regenerating ion exchange resins with chemicals. Patent Literature 3 discloses that the deionization chamber of an EDI device is filled with a mixture of an anion exchange resin and a cation exchange resin, thar part of the anion exchange resin is a catalyst resin on which copper or palladium is carried, and that hydrogen is added to the water to be treated supplied to the deionization chamber to perform, in the deionization chamber, deionization treatment of the water to be treated and removal of dissolved oxygen from the water to be treated. Since cathode water discharged from the cathode chamber of the EDI device contains hydrogen, Patent Literature 3 also discloses that the cathode water is used as a hydrogen source and added to the water to be treated. However, when the cathode water is added to the water to be treated, a pump to pressurize the cathode water is necessary to add the cathode water to the water to be treated because the pressure at the outlet of the cathode chamber is generally lower than the pressure of the water to be treated at the inlet of the deionization chamber. Patent Literature 4 discloses that hydrogen peroxide in water to be treated can be decomposed and removed by bringing the water to be treated into contact with an anion exchange resin on which platinum, palladium or the like is supported.

CITATION LIST

Patent Literature

Patent Literature 1: JP H05-096283 A
Patent Literature 2: JP H07-241569 A
Patent Literature 3: JP H10-272474 A
Patent Literature 4: JP 2007-185587 A

SUMMARY OF INVENTION

Technical Problem

According to the consideration by the present inventors, it has been found that there is room for improving the removal rate of dissolved oxygen in water to be treated in the technique disclosed in Patent Literature 3. Further, although the technique disclosed in Patent Literature 3 is a technique capable of removing dissolved oxygen in water to be treated and performing deionization without requiring a vacuum pump or the like, it is necessary to separately provide a mechanism for adding hydrogen to the water to be treated. In case of adding the cathode water to the water to be treated, a pump to pressurize the cathode water is required because the pressure at the outlet of the cathode chamber is generally lower than the pressure at the inlet of the deionization chamber.

It is an object of the present invention to provide a water treatment method and a water treatment apparatus capable of efficiently removing dissolved oxygen or the like in water to be treated with a simple configuration.

Solution to Problem

In the EDI device disclosed in Patent Literature 3, part of the anion exchange resin filled in the deionization chamber is a catalytic resin on which copper or palladium is supported, and the catalytic resin and cation exchange resin which is not a catalytic resin are mixed, that is, in a mixed bed configuration, and filled in the deionization chamber. However, according to the consideration by the present inventors, as shown in the Examples and Comparative Examples described later, it was found that the dissolved oxygen removal rate becomes high and the power consumption becomes low when the deionization chamber is filled with the catalytic resin in a single bed configuration at least in part rather than when the deionization chamber is filled with the catalytic resin in a mixed bed configuration. Furthermore, the present inventors paid attention to the cathode chamber, which has not been effectively utilized for deionization treatment in conventional EDI devices, and found that dissolved oxygen in water to be treated can be removed by reacting, in the cathode chamber, hydrogen generated by the cathodic reaction in the cathode chamber with dissolved oxygen. In this case, since it is intended also to remove dissolved oxygen, a deionization chamber as an EDI device may not be necessarily provided.

According to the first aspect of the present invention, the water treatment method is a water treatment method for removing at least dissolved oxygen contained in water to be treated, the method including: a step of applying a DC current between an anode and a cathode: and a step of passing the water to be treated through a dissolved oxygen removal chamber, which is located between the anode and the cathode and filled with an ion exchanger, wherein at least a portion of the ion exchanger filled in the dissolved oxygen removal chamber is an ion exchanger on which a metal catalyst is supported, and wherein the ion exchanger on which the metal catalyst is supported is filled in a single bed configuration in at least a portion of the dissolved oxygen removal chamber. In this water treatment method, the step of applying the DC current between the anode and cathode and the step of passing the water to be treated through the dissolved oxygen removal chamber may be performed simultaneously or separately.

The water treatment apparatus for implementing the above method is a water treatment apparatus for removing at least dissolved oxygen contained in treated water, including: an anode and a cathode: and a dissolved oxygen removal chamber which is located between the anode and the cathode and filled with an ion exchanger, and through which the water to be treated passes, wherein at least a portion of the ion exchanger filled in the dissolved oxygen removal chamber is an ion exchanger on which a metal catalyst is supported, wherein the ion exchanger on which the metal catalyst is supported is filled in a single bed configuration in at least a portion of the dissolved oxygen removal chamber, and wherein a DC current is applied between the anode and the cathode.

In the first aspect, dissolved oxygen can be removed in the dissolved oxygen removal chamber because dissolved oxygen reacts with hydrogen in the presence of a metal catalyst to form water. Therefore, unless the water to be treated originally contains hydrogen, hydrogen must be generated in the dissolved oxygen removal chamber or added to the water to be treated upstream of the dissolved oxygen removal chamber. The water treatment apparatus according to the first aspect is basically the same as a general EDI device, except that it is configured to remove dissolved oxygen. In the cathode chamber of an EDI device, hydrogen is generated by the cathodic reaction on the surface of the cathode. Therefore, in the water treatment apparatus according to the first aspect, water to be treated containing hydrogen can be supplied to the dissolved oxygen removal chamber by first supplying the water to be treated to the cathode chamber and then passing the outlet water of the cathode chamber, that is, the water to be treated that has passed through the cathode chamber, through the dissolved oxygen removal chamber. Alternatively, the cathode chamber itself can be used as the dissolved oxygen removal chamber.

In the EDI device disclosed in Patent Literature 3, the outlet water of the cathode chamber is added to water to be treated which is supplied to the deionization chamber, the deionization chamber functioning as a dissolved oxygen removal chamber. Since the pressure of the outlet water of the cathode chamber is generally much lower than the pressure of the water to be treated at the inlet of the deionization chamber, a pump is needed to boost the pressure of the outlet water of the cathode chamber. When boosting pressure with a pump, bubbly hydrogen in the outlet water of the cathode chamber may cause so-called air entrainment of the pump. To prevent air entrainment or the like, the outlet water from the cathode chamber could be received in a tank and then the outlet water is fed by a pump. However, once the outlet water is received in the tank, hydrogen present at or above solubility will diffuse into the atmosphere and the hydrogen utilization efficiency will be reduced. In contrast, in the water treatment apparatus according the first aspect, the outlet water from the cathode chamber is used as it is as the inlet water to the dissolved oxygen removal chamber. In other words, the dissolved oxygen removal chamber should be connected in series with the cathode chamber with respect to the flow of the water to be treated. In this configuration, no pump for boosting pressure is required and no dissipation of hydrogen generated in the cathode chamber occurs, and thus the efficiency of hydrogen utilization can be increased. If the amount of hydrogen contained in the outlet water from the cathode chamber is not sufficient to remove dissolved oxygen, hydrogen can be injected, for example, into the line connecting the outlet of the cathode chamber and the inlet of the dissolved oxygen removal chamber. Even when the hydrogen produced in the cathode chamber is not used for removal of dissolved oxygen, it is possible to supply the water to be treated containing hydrogen to the dissolved oxygen removal chamber if a means for supply hydrogen to the water to be treated is provided upstream of the dissolved oxygen removal chamber.

The mass of hydrogen that reacts stoichiometrically with oxygen is one eighth, or 0.125 times the mass of oxygen. In view of this, in the water treatment method of the first aspect, whatever the means for adding hydrogen to the water to be treated, the amount of hydrogen contained in the water to be treated supplied to the dissolved oxygen removal chamber is preferably adjusted so that the mass ratio of the amount of hydrogen supplied to the dissolved oxygen removal chamber per unit time to the dissolved oxygen load amount to be treated in the water to be treated is 0.1 or more and 0.4 or less.

The water treatment apparatus of the first aspect is typically an apparatus that can also remove dissolved oxygen in the deionization chamber of an EDI device. Therefore, it is preferable that the dissolved oxygen removal chamber is defined by an ion exchange membrane, and, by being defined by an ion exchange membrane, the deionization treatment of the water to be treated can be efficiently performed in the dissolved oxygen removal chamber. Alternatively, the anode chamber or the cathode chamber in an EDI device can be used as the dissolved oxygen removal chamber, in which case the dissolved oxygen removal chamber is defined by an electrode plate that is the anode or cathode.

According to the second aspect of the present invention, the water treatment method is a water treatment method for removing at least dissolved oxygen contained in water to be treated, the method including: a step of applying a DC current between an anode provided in an anode chamber and a cathode provided in a cathode chamber which is filled with an ion exchanger; and a step of passing the water to be treated through the cathode chamber, wherein at least a portion of the ion exchanger filled in the cathode chamber is an ion exchanger on which a metal catalyst is supported. In this water treatment method, the step of applying the DC current between the anode and cathode and the step of passing the water to be treated through the cathode chamber may be performed simultaneously or separately.

The water treatment apparatus for implementing the water treatment method of the second aspect includes: an anode chamber equipped with an anode: and a cathode chamber equipped with a cathode, filled with ion exchanger, and supplied with water to be treated, wherein at least a portion of the ion exchanger filled in the cathode chamber is an ion exchanger on which a metal catalyst is supported, and wherein a DC current is applied between the anode and the cathode.

It is preferred that the cathode chamber in the water treatment apparatus of the second aspect is defined by an ion exchange membrane on the side facing the anode chamber. If the cathode chamber is defined by an ion exchange membrane, ions captured by the ion exchanger in the cathode chamber can be moved to the outside of the cathode chamber through the ion exchange membrane. Since the ion exchanger in the cathode chamber can be regenerated, the removal performance of dissolved oxygen can be maintained for a long period of time. More specifically, it is preferable that the ion exchanger filled in the cathode chamber is an anion exchanger such as an anion exchange resin and the ion exchange membrane defining the cathode chamber is an anion exchange membrane. In such a configuration, anions in the water to be treated, such as carbonate and bicarbonate ions, are adsorbed on the anion exchanger, and then the anion exchanger is regenerated by hydroxide ions produced by the electrolysis reaction of water that proceeds at the cathode, thereby the liberated anions moving to the outside of the cathode chamber through the anion exchange membrane. As a result, deionization treatment for anions such as carbonate and bicarbonate ions is performed on the water to be treated in the cathode chamber. In other words, in the cathode chamber, not only the removal treatment of dissolved oxygen but also decarbonation treatment is performed for the water to be treated.

If the removal process described above of dissolved oxygen is performed in the cathode chamber of a typical EDI device, this removal process proceeds independently of the deionization process in the deionization chamber of the EDI device. Therefore, the water treatment apparatus of the second aspect can be easily realized by using an existing EDI device and using an ion exchanger on which a metal catalyst is supported as the ion exchanger to be filled in its cathode chamber. In this case, the deionization chamber of the EDI device can be fed with water to be treated that is different from the water to be treated that is subject to the removal of dissolved oxygen. Alternatively, water to be treated after the dissolved oxygen has been removed by passing through the cathode chamber may be passed through the deionization chamber to deionize the water to be treated.

Any catalyst that promotes the reaction that generates water from hydrogen and oxygen can be used for both the metal catalyst supported on the ion exchanger that is filled in the dissolved oxygen removal chamber in the first aspect described above and the metal catalyst that is filled in the cathode chamber in the second aspect. Examples of such metal catalysts include iron, copper, manganese, palladium, platinum, and the like. Among them, a platinum group metal catalyst not only promotes the reduction reaction of oxygen, but also has high catalytic activity for hydrogen peroxide decomposition. Therefore, the platinum group metal catalyst is suitable for use when hydrogen peroxide is contained in the water to be treated. The platinum group metal catalyst is a catalyst containing one or more metals selected from ruthenium, rhodium, palladium, osmium, iridium and platinum. The platinum group metal catalyst may contain any one of these metal elements alone or a combination of two or more of them. Among these, platinum, palladium, and platinum-palladium alloys have high catalytic activity and are suitably used as the platinum group metal catalyst.

Advantageous Effect of Invention

According to the aspects described above, dissolved oxygen or the like in water to be treated can be efficiently removed with a simple configuration.

BRIEF DESCRIPTION OF DRAWINGS

FIG. 1 A view illustrating a water treatment apparatus according to a first embodiment;

FIG. 2 A view illustrating another example of the water treatment apparatus;

FIG. 3 A view illustrating another example of the water treatment apparatus;

FIG. 4 A view illustrating another example of the water treatment apparatus;

FIG. 5A A view illustrating another example of the water treatment apparatus;

FIG. 5B A view illustrating another example of the water treatment apparatus;

FIG. 5C A view illustrating another example of the water treatment apparatus;

FIG. 6A A view illustrating another example of the water treatment apparatus;

FIG. 6B A view illustrating another example of the water treatment apparatus;

FIG. 7 A view illustrating another example of the water treatment apparatus;

FIG. 8 A view illustrating a water treatment apparatus according to a second embodiment;

FIG. 9 A view illustrating another example of the water treatment apparatus;

FIG. 10 A view illustrating the water treatment apparatus configured as an EDI device;

FIG. 11 A view illustrating another example of the water treatment apparatus configured as an EDI device;

FIG. 12 A flow sheet illustrating an example of a water treatment system provided with the water treatment apparatus;

FIG. 13 A flow sheet illustrating another example of the water treatment system provided with the water treatment apparatus;

FIG. 14 A flow sheet illustrating another example of the water treatment system provided with the water treatment apparatus;

FIG. 15 A view illustrating the water treatment apparatus in Comparative Example 1;

FIG. 16 A graph illustrating the relationship between current density and dissolved oxygen removal rate;

FIG. 17 A graph illustrating the relationship between power consumption and dissolved oxygen removal rate;

FIG. 18 A graph illustrating the relationship between electric current per dissolved oxygen load amount and dissolved oxygen removal rate; and FIG. 19 A graph illustrating the relationship between space velocity in Pd-supported anion current and dissolved oxygen removal rate; and FIG. 20 A graph illustrating the relationship between current density and dissolved oxygen removal rate.

DESCRIPTION OF EMBODIMENTS

Next, the preferred embodiments of the present invention will be described with reference to the drawings. FIG. 1 illustrates the basic configuration of a water treatment apparatus according to the first embodiment of the present invention.

The water treatment apparatus shown in FIG. 1 removes dissolved oxygen from water to be treated as well as performs deionization. Similar to a general EDI device, The water treatment apparatus shown in FIG. 1 includes anode chamber 21 in which anode 11 is provided and cathode chamber 25 in which cathode 12 is provided, and further includes concentration chamber 22, dissolved oxygen removal chamber 23 and concentration chamber 24 in this order from a side of anode chamber 21 between anode chamber 21 and cathode chamber 25. Anode chamber 21 and concentration chamber 22 are partitioned by cation exchange membrane 31, concentration chamber 22 and dissolved oxygen removal chamber 23 are partitioned by anion exchange membrane 32, dissolved oxygen removal chamber 23 and concentration chamber 24 are partitioned by cation exchange membrane 33, and concentration chamber 24 and cathode chamber 25 are partitioned by anion exchange membrane 34. Anode chamber 21 is filled with a cation exchange resin (CER), which is a cation exchanger, and concentration chambers 22, 24 and cathode chamber 25 are filled with an anion exchange resin (AER), which is an anion exchanger. Dissolved oxygen removal chamber 23 is filled with an ion exchanger with a metal catalyst in a single bed configuration, the metal catalyst being supported on the surface of the ion exchanger. In the present embodiment, an anion exchange resin with palladium (Pd) supported on the surface thereof is packed in dissolved oxygen removal chamber 23 in a single bed configuration. In the following description, the anion exchange resin with palladium (Pd) supported on the surface thereof is referred to as Pd-supported anion exchange resins (Pd AER).

The water to be treated is supplied to cathode chamber 25, and the outlet water from cathode chamber 25 is supplied as it is to the inlet of dissolved oxygen removal chamber 23. Treated water from which dissolved oxygen has been removed and which has been subjected to deionization treatment is discharged from dissolved oxygen removal chamber 23. Supply water is supplied to concentration chambers 22, 24, the outlet water from concentration chambers 22, 24 is supplied to anode chamber 21, and the outlet water from anode chamber 21 is discharged outside the water treatment apparatus. The supply water is not particularly limited, and may be water obtained by treatment with a reverse osmosis membrane device after removing turbidity or oxidizing substances from, for example, tap water, industrial water, groundwater, and the like. Anode chamber 21 may be fed directly with the supply water instead of the outlet water of concentration chambers 22, 24, that is, concentrated water. Dissolved oxygen removal chamber 23 may be fed with water to be treated from another line separate from the outlet water of cathode chamber 25.

Next, the removal of dissolved oxygen using the water treatment apparatus shown in FIG. 1 will be described. In a state that a DC current is applied between anode 11 and cathode 12 and concentrate chambers 22, 24 are supplied with the supply water, the water to be treated is supplied to cathode chamber 25. In cathode chamber 25, the DC current causes a cathodic reaction to proceed on the surface of cathode 12 to generate hydrogen, so the water to be treated discharged from cathode chamber 25 as outlet water will contain hydrogen. This hydrogen may not only dissolve in the water to be treated, but may also be dispersed in the water to be treated as tiny bubbles. Thus, the water to be treated containing hydrogen flows directly into dissolved oxygen removal chamber 23. On the surface of the Pd-supported anion exchange resin (Pd AER) filled in dissolved oxygen removal chamber 23, dissolved oxygen in the water to be treated reacts with hydrogen to generate water. The dissolved oxygen in the water to be treated decreases by the amount that reacts with hydrogen. Since the reaction rate of hydrogen and oxygen in the presence of palladium, which is the metal catalyst, is large, if a sufficient amount of hydrogen is contained in the water to be treated, the treated water from which dissolved oxygen is sufficiently removed is discharged from cathode chamber 25. Since dissolved oxygen is removed if hydrogen is present in dissolved oxygen removal chamber 23, dissolved oxygen can also be removed by intermittent application of the DC current between anode 11 and cathode 12 in consideration of residence time of the water to be treated in dissolved oxygen removal chamber 23 and cathode chamber 25. Furthermore, while the DC current is applied continuously or intermittently, the water to be treated may also be passed through dissolved oxygen removal chamber 23 intermittently.

Since the Pd-supported anion exchange resin is an anion exchanger, dissolved oxygen removal chamber 23 filled with the Pd-supported anion exchange resin functions in the same way as the deionization chamber in a general EDI device, and deionization treatment of the water to be treated also proceeds in dissolved oxygen removal chamber 23. For example, anions such as carbonate ion ($CO_3^{2-}$) and hydrogen carbonate ion ($HCO_3^-$) in the water to be treated are captured by the Pd-supported anion exchange resin. Since hydroxide ions ($OH^-$) are also generated by the dissociation of water on the surface of cation exchange membrane 33 on the side of dissolved oxygen removal chamber 23, the anions captured by the Pd-supported anion exchange resin (Pd AER) are ion-exchanged by hydroxide ions and liberated, and then move by the electric field between anode 11 and cathode 12 and travel to concentration chamber 22 through anion exchange membrane 32. The anions that have moved to concentration chamber 22 are then discharged to the outside of the apparatus through anode chamber 21 on the flow of the supply water in concentration chamber 22.

Since the Pd-supported anion exchange resin can also decompose hydrogen peroxide, the water treatment apparatus according to the present embodiment can also remove hydrogen peroxide from the water to be treated. When the Pd-supported anion exchange resin decomposes hydrogen peroxide, the decomposition products are hydrogen and oxygen. Since the produced oxygen reacts with hydrogen in the presence of Pd-supported anion exchange resin to form water, the dissolved oxygen concentration does not increase due to the decomposition and removal of hydrogen peroxide.

FIG. 2 shows another example of the water treatment apparatus according to the first embodiment. The water treatment apparatus shown in FIG. 2 is similar to the water treatment apparatus shown in FIG. 1, but differs from that shown in FIG. 1 in that dissolved oxygen removal chamber 23 has a multilayered bed configuration and the Pd-supported anion exchange resin is provided only in the upstream side of the flow in dissolved oxygen removal chamber 23. In the downstream side of dissolved oxygen removal chamber 23, an anion exchange resin (AER) which does not support a metal catalyst is filled. Since the reaction rate between hydrogen and oxygen in the presence of the Pd-supported anion exchange resin is sufficiently large, dissolved oxygen in the water to be treated can be sufficiently removed even when the Pd-supported anion exchange resin is packed in a multilayered configuration such that the Pd-supported anion exchange resin is arranged in part of dissolved oxygen removal chamber 23. In the case that the Pd-supported anion exchange resin is arranged in dissolved oxygen removal chamber 23 in a multilayered bed configuration, if the configuration is such that, in the region where the Pd-supported anion exchange resin is arranged, nothing other than the Pd-supported anion exchange resin exists (i.e., single bed configuration), the layer of the Pd-supported anion exchange resin may be filled at any location within dissolved oxygen removal chamber 23. In such a case, it is of course necessary to prevent occurrence of the water to be treated which flows through dissolved oxygen removal chamber 23 without passing through the layer of the Pd-supported anion exchange resin layer. In the configuration shown in FIG. 2, the cost can be reduced because the amount of expensive palladium catalyst used can be reduced.

FIG. 3 shows yet another example of the water treatment apparatus. The water treatment apparatus shown in FIG. 3 is similar to the water treatment apparatus shown in FIG. 2, but differs from the one shown in FIG. 2 in that the ion exchanger filled in the downstream region of dissolved oxygen removal chamber 23, which is in a multilayered bed configuration, is a cation exchange resin (CER) not supporting a metal catalyst, rather than an anion exchange resin not supporting a metal catalyst.

FIG. 4 shows yet another example of the water treatment apparatus. The water treatment apparatus shown in FIG. 4 is similar to the water treatment apparatus shown in FIG. 2, but differs from the one shown in FIG. 2 in that the downstream region of dissolved oxygen removal chamber 23, which is in a multilayered bed configuration, is filled with an anion exchange resin not supporting a metal catalyst and a cation exchange resin not supporting a metal catalyst in a mixed bed configuration (MB).

In the water treatment apparatuses shown in FIGS. 1 to 4, between anode 11 and cathode 12, a deionization chamber can be provided adjacent to dissolved oxygen removal chamber 23 via an intermediate ion exchange membrane on the cathode side or the anode side of dissolved oxygen removal chamber 23, and the outlet water from dissolved oxygen removal chamber 23 may be passed through the deionization chamber, or the outlet water from cathode chamber 25 may be supplied to dissolved oxygen removal chamber 23 after passing through the deionization chamber. The intermediate ion exchange membrane can be an anion exchange membrane, a cation exchange membrane, or a composite membrane such as a bipolar membrane. This configuration can further enhance the deionization performance of the water treatment apparatus as a whole.

FIG. 5A shows an example of such a water treatment apparatus in which a deionization chamber is provided adjacent to dissolved oxygen removal chamber 23. The water treatment apparatus shown in FIG. 5A is configured such that, in the water treatment apparatus shown in FIG. 1, deionization chamber 26 is arranged between dissolved oxygen removal chamber 23 and concentration chamber 24. Dissolved oxygen removal chamber 23 and deionization chamber 26 are partitioned by cation exchange membrane 35, which is an intermediate ion exchange membrane, and deionization chamber 26 and concentration chamber 24 are partitioned by cation exchange membrane 33. Deionization chamber 26 is filled with a cation exchange resin. The outlet water from cathode chamber 25 is first supplied to dissolved oxygen removal chamber 23, and the outlet water from dissolved oxygen removal chamber 23 is supplied to deionization chamber 26. The treated water from which dissolved oxygen is removed and which is subjected to the deionization treatment flows out from deionization chamber 26.

The water treatment apparatus shown in FIG. 5B is configured such that, in the water treatment apparatus shown in FIG. 5A, the supply water is supplied directly to anode chamber 21 instead of the outlet water of concentration chambers 22, 24 being supplied to anode chamber 21, and water to be treated supplied from a line which is different from the line for the water to be treated supplied to cathode chamber 25 is supplied to dissolved oxygen removal chamber 23 together with the outlet water from cathode chamber 25. By supplying the water to be treated from the different line to dissolved oxygen removal chamber 23, the overall capacity of the water treatment apparatus as a whole is improved. Electrode water is discharged from anode chamber 21, and concentrated water is discharged from concentration chambers 22, 24.

The ion exchange membrane that can be used as the intermediate ion exchange membrane partitioning dissolved oxygen removal chamber 23 and deionization chamber 26 is not limited to a cation exchange membrane. The water treatment apparatus shown in FIG. 5C is configured such that, in the water treatment apparatus shown in FIG. 5A, anion exchange membrane 36 is used as the intermediate ion exchange membrane partitioning dissolved oxygen removal chamber 23 and deionization chamber 26 and deionization chamber 26 has a multilayered bed configuration. In deionization chamber 26, the inlet side is filled with a cation exchange resin (CER) not supporting a metal catalyst supported, and the outlet side with an anion exchange resin (AER) not supporting a metal catalyst.

The water treatment apparatuses shown in FIGS. 1, 2, 3, 4, 5A, 5B and 5C have the same configuration as a general EDI device, except that the deionization chamber functions as a dissolved oxygen removal chamber so that not only deionization treatment but also removal of dissolved oxygen can be performed in the dissolved oxygen removal chamber. In a general EDI device, a plurality of deionization chambers can be placed between the anode and the cathode. Also in the water treatment apparatuses shown in FIGS. 1, 2, 3, 4, 5A, 5B and 5C, assuming that a repeating unit consists of anion exchange membrane 32, dissolved oxygen removal chamber 23, cation exchange membrane 33 and concentration chamber 24, a plurality of dissolved oxygen removal chambers 23 can be arranged between anode 11 and cathode 12 by arranging a plurality of the repeating units between concentration chamber 22 adjacent to anode chamber 21 and anion exchange membrane 34 defining cathode chamber 25.

The water treatment apparatus shown in FIG. 6A is configured such that, in the water treatment apparatus shown in FIG. 1, a plurality of dissolved oxygen removal chambers 23 are arranged and the outlet water from cathode chamber 25 is distributed and passed through the plurality of dissolved oxygen removal chambers 23 in parallel. From each of dissolved oxygen removal chambers 23, deionized water in which dissolved oxygen has been removed and which is subjected to deionization treatment is discharged.

The water treatment apparatus shown in FIG. 6B is configured such that, in the water treatment apparatus shown in FIG. 6A, the supply water is supplied directly to anode chamber 21 instead of the outlet water of concentration chambers 22, 24 being supplied to anode chamber 21, and water to be treated supplied from a line which is different from the line for the water to be treated supplied to cathode chamber 25 is supplied to dissolved oxygen removal chamber 23 together with the outlet water from cathode chamber 25. Electrode water is discharged from anode chamber 21, and concentrated water is discharged from concentration chambers 22, 24.

In the water treatment apparatus based on the present invention, the cathode chamber itself can function as a dissolved oxygen removal chamber, and in such a case, it is no longer necessary to provide a separate dissolved oxygen removal chamber from the cathode chamber. Next, as the second embodiment, a water treatment apparatus in which the cathode chamber itself functions as a dissolved oxygen removal chamber will be explained. FIG. 7 shows the basic configuration of the water treatment apparatus according to the second embodiment of the present invention.

The water treatment apparatus shown in FIG. 7 includes: anode chamber 21 in which anode 11 is provided, concentration chamber 24 that is partitioned from anode chamber 21 by cation exchange membrane 31, and cathode chamber 25 in which cathode 12 is provided and which is partitioned from concentration chamber 24 by anion exchange membrane 34. Anode chamber 21 is filled with a cation exchange resin (CER), which is a cation exchanger, and concentration chamber 24 is filled with an anion exchange resin (AER), which is an anion exchanger. Cathode chamber 25 is filled with an ion exchanger which supports a metal catalyst on the surface thereof. Specifically, cathode chamber 25 is filled with the Pd-supported anion exchange resin in a single bed. Water to be treated containing dissolved oxygen is supplied to cathode chamber 25, and the water to be treated passes through cathode chamber 25. Supply water is supplied to concentration chamber 24, and the outlet water from concentration chamber 24 is supplied directly to anode chamber 21. The supply water that has passed through anode chamber 21 is discharged from anode chamber 21 as waste water. The supply water is not particularly limited, and may be water obtained by treatment with a reverse osmosis membrane device after removing turbidity or oxidizing substances from, for example, tap water, industrial water, groundwater, and the like.

In the water treatment apparatus shown in FIG. 7, the water to be treated is supplied to cathode chamber 25 in a state that a DC current is applied between anode 11 and cathode 12 and the supplied water is supplied to concentration chamber 24. In cathode chamber 25, the DC current causes a cathodic reaction to proceed on the surface of cathode 12 and hydrogen is produced. This hydrogen reacts with dissolved oxygen in the water to be treated on the surface of the Pd-supported anion exchange resin (Pd AER), resulting in the formation of water. The dissolved oxygen in the water to be treated decreases by the amount that reacts with hydrogen. The reaction rate of hydrogen and oxygen in the presence of palladium, which is a metal catalyst, is large, so if a sufficient amount of hydrogen is generated, treated water from which dissolved oxygen has sufficiently been removed is discharged from cathode chamber 25. As a result, the treated water from which dissolved oxygen has sufficiently been removed is discharged from cathode chamber 25. Since the presence of hydrogen in cathode chamber 25 removes dissolved oxygen, the application of the DC current between anode 11 and cathode 12 can be intermittent in consideration of residence time of the water to be treated in cathode chamber 25. Furthermore, while the DC current is applied continuously or intermittently, the water to be treated may also be passed through dissolved oxygen removal chamber 23 intermittently.

Since the Pd-supported anion exchange resin is an anion exchanger, anions such as carbonate ions ($CO_3^{2-}$) and hydrogen carbonate ions ($HCO_3^-$) in the water to be treated are captured by the Pd-supported anion exchange resin in cathode chamber 25. Since the cathodic reaction at cathode 12 also generates hydroxide ions ($OH^-$), the anions captured by the Pd-supported anion exchange resin are ion-exchanged by the hydroxide ions and liberated, and then move by the electric field between anode 11 and cathode 12 and travel to concentration chamber 24 through anion exchange membrane 34. The anions that have moved to concentration chamber 24 are then discharged to the outside of the apparatus through anode chamber 21 on the supply water flow in concentration chamber 24. In other words, also in the water treatment apparatus shown in FIG. 7, deionization treatment for anions is performed in cathode chamber 25. Since the Pd-supported anion exchange resin can also decompose hydrogen peroxide, this water treatment apparatus can also remove hydrogen peroxide in the water to be treated in the same way as the water treatment apparatuses shown in FIGS. 1 to 6.

By using the Pd-supported anion exchange resin, the water treatment apparatus according to the present embodiment can also remove hydrogen peroxide from the water to be treated. When the Pd-supported anion exchange resin decomposes hydrogen peroxide, the decomposition products are hydrogen and oxygen. Since the oxygen produced reacts with hydrogen in the presence of the Pd-supported anion exchange resin to form water, the dissolved oxygen concentration does not increase due to the decomposition and removal of hydrogen peroxide. In the water treatment system shown in FIG. 7, anode chamber 21 may also function as concentration chamber 24. In such a case, cation exchange membrane 31 can be removed to combine anode chamber 21 and concentration chamber 24 into a single structure.

FIG. 8 shows another example of the water treatment apparatus in the second embodiment. The water treatment apparatus shown in FIG. 8 is similar to the water treatment apparatus shown in FIG. 7, but differs from the one shown in FIG. 7 in that cathode chamber 25 has a multilayered bed configuration and the Pd-supported anion exchange resin is provided only downstream side of the flow in cathode chamber 25. The upstream side of the flow in cathode chamber 25 is filled with anion exchange resin (AER) which does not carry a metal catalyst. Since the cathodic reaction in cathode chamber 25 proceeds over the entire surface of cathode 12 and the reaction rate between hydrogen and oxygen in the presence of Pd-supported anion exchange resin is sufficiently large, dissolved oxygen in the water to be treated can be sufficiently removed even if the Pd-supported anion exchange resin is placed only at the outlet side in cathode chamber 25. In the configuration shown in FIG. 8, the cost can be reduced because the amount of expensive palladium catalyst used can be reduced. To reduce the amount of the Pd-supported anion exchange resin used, it could be consider that cathode chamber 25 is filled with the Pd-supported anion exchange resin and other anion or cation exchange resins in a mixed manner (in a mixed bed configuration). However, in order to improve hydrogen utilization efficiency, it is preferable to fill at least a portion of cathode chamber 25 with the Pd-supported anion exchange resin in a single bed configuration. In other words, when filling cathode chamber 25 with the Pd-supported anion exchange resin, it is preferable to fill them in a single bed configuration or a multilayered configuration.

The water treatment apparatuses shown in FIGS. 7 and 8 have a configuration that a deionization chamber is excluded from a general EDI device, but the water treatment apparatus according to the second embodiment can be also provided with a deionization chamber to have the same configuration as a general EDI device so that deionization treatment is performed in the deionization chamber and removal treatment of dissolved oxygen is performed in the cathode chamber. FIG. 9 shows the water treatment apparatus of the second embodiment which is configured as an EDI device. The water treatment apparatus shown in FIG. 9 is configured such that, in the water treatment system shown in FIG. 7, concentration chamber 22 and deionization chamber 26 are provided in that order from the side of anode chamber 21 between anode chamber 21 and concentration chamber 24.

Anode chamber 21 and concentration chamber 22 are partitioned by cation exchange membrane 31, concentration chamber 22 and deionization chamber 26 are partitioned by anion exchange membrane 32, and deionization chamber 26 and concentration chamber 24 are partitioned by cation exchange membrane 33. Concentration chamber 22 is filled with an anion exchange resin (AER), and deionization chamber 26 is filled with a cation exchange resin and an anion exchange resin in a mixed bed (MB). Deionization chamber 26 is supplied with water to be treated that is different from the water to be treated which is the target of removal of dissolved oxygen. Supply water is supplied to anode chamber 21 and concentration chambers 22, 24. Electrode water is discharged from anode chamber 21 and concentration water is discharged from concentration chambers 22, 24.

In the water treatment apparatus shown in FIG. 9, by applying a DC current between anode 11 and cathode 12, deionization treatment is performed in deionization chamber 26 for the water to be treated, similar to the deionization chamber in a general EDI device, and the deionized water is discharged from deionization chamber 26. Meanwhile, in cathode chamber 25, as in the water treatment apparatus shown in FIG. 7, treatment is performed to remove dissolved oxygen contained in the water to be treated, and treated water from which dissolved oxygen has been removed is discharged from cathode chamber 25. At this time, hydrogen peroxide contained in the water to be treated is also removed, as described above.

FIG. 10 shows another example of the water treatment apparatus of the second embodiment configured as an EDI device. The water treatment apparatus shown in FIG. 10 is configured such that, in the water treatment apparatus shown in FIG. 9, the treated water discharged from cathode chamber 25 is directly supplied to deionization chamber 26. Therefore, according to the water treatment apparatus shown in FIG. 10, deionized water in which dissolved oxygen is removed and hydrogen peroxide is also removed can be obtained.

Generally, in an EDI device, a plurality of deionization chambers can be placed between the anode and cathode. In the water treatment apparatuses shown in FIGS. 9 and 10, each of which is configured as an EDI device, assuming that configuration consisting of anion exchange membrane 32, desalination chamber 26, cation exchange membrane 33 and concentration chamber 24 is also a repeating unit, a plurality of deionization chambers 26 can be arranged between anode 11 and cathode 12 by arranging a plurality of the repeating units between concentration chamber 22 adjacent to anode chamber 21 and anion exchange membrane 34 defining cathode chamber 25. The water treatment apparatus shown in FIG. 11 is configured such that, in the water treatment apparatus shown in FIG. 10, a plurality of deionization chambers 26 are arranged, and the treated water discharged from cathode chamber 25 is distributed in parallel to the plurality of deionization chambers 26 and passed through them. From each deionization chamber 26, deionized water in which dissolved oxygen has been removed and which is subjected to the deionization treatment is discharged.

The water treatment apparatuses according to each embodiment of the present invention have been described above. These water treatment apparatuses can be incorporated into a water treatment system for producing pure or ultrapure water. The water treatment systems for producing pure or ultrapure water is configures by combining, for example, an activated carbon (AC) device, a reverse osmosis membrane device (RO), an ultraviolet irradiation device (UV), an ion exchange resin device (IER), a membrane degassing device (MD), an EDI device, a non-regenerative ion exchange device (CP), various filters, and the like. Since the water treatment apparatus according to the present invention can perform removal of dissolved oxygen, removal of hydrogen peroxide, deionization treatment, and the like, it can be used to replace one or more of a membrane degassing device, an ion exchange resin device, an EDI device and a non-regenerative ion exchange device. Alternatively, the water treatment apparatus according to the present invention can be arranged at a preceding stage or a subsequent stage of a membrane degassing device, an ion exchange resin device, an EDI device or a non-regenerative ion exchange device to improve removal performance of impurity components. FIG. 12 shows an example of a water treatment system incorporating the water treatment apparatus according to the present invention.

The water treatment system shown in FIG. 12 is a system that generates ultrapure water from raw water such as tap water, and consists of a primary pure water system that generates primary pure water from the raw water and a subsystem that generates ultrapure water from the primary pure water. In the drawings, reference numeral 100 indicates any of the water treatment apparatuses which are explained by using FIGS. 1 to 11. In the primary pure water system, raw water tank 41, first reverse osmosis membrane device 51, second reverse osmosis membrane device 52, reverse osmosis treated water tank 42, ultraviolet irradiation (UV) device 55, and water treatment device 100 are arranged in this order, and the raw water is treated in this order, resulting in the production of primary pure water. If water treatment apparatus 100 according to the present invention is not used, an ion exchange resin device, an EDI device or a non-regenerative ion exchange system would be provided instead of water treatment apparatus 100, and further, a membrane degassing device would be provided. In the primary pure water system, the produced primary pure water is circulated to reverse osmosis treated water tank 42 when the subsequent facility, which is the destination of the produced pure water, becomes full.

In the subsystem, pure water tank 45 is provided which stores the primary pure water from the primary pure water system, and ultraviolet irradiation device (UV) 61, non-regenerative ion exchange device (CP) 63, membrane degassing device (MD) 65 and ultrafiltration membrane (UF) 67 are arranged in this order to the outlet of pure water tank 45, and the primary pure water is treated in this order to produce ultrapure water. A portion of the ultrapure water produced is circulated to pure water tank 45. Microfiltration membranes may be used instead of ultrafiltration membranes (UF) 67. In the subsystem, the water treatment apparatus according to the present invention may be installed in place of non-regenerative ion exchange device 63 and membrane degassing device 65. Alternatively, the water treatment apparatus according to the present invention may be installed at a preceding or subsequent stage of non-regenerative ion exchange device 63 and membrane degassing device 65. When installing membrane degassing devices in both the primary pure water system and the subsystem, the overall dissolved oxygen removal rate may be increased by installing a plurality of membrane degassing devices in series. When a plurality of membrane degassing devices are installed in series in this way, some of the membrane degassing devices may be replaced with the water treatment apparatuses according to the present invention.

FIG. 13 shows another example of the water treatment system incorporating the water treatment apparatus according to the present invention. The water treatment system shown in FIG. 13 is configured such that, in the water treatment system shown in FIG. 12, the position of water treatment apparatus is at the preceding stage of ultraviolet irradiation device 55 of the primary pure water system, and treatment device (IER/EDI) 56, which is one of an ion exchange resin device or an EDI device, is placed at the subsequent stage of ultraviolet irradiation device 55. The water in reverse osmosis treated water tank 42 passes through water treatment apparatus 100 according to the present invention, ultraviolet irradiation device 55 and treatment system 56 in this order, and the primary pure water is discharged from treatment system 56, which is one of the ion exchange resin system and the EDI device. When decomposition and removal of total organic carbon (TOC) components is performed by irradiating the water to be treated with ultraviolet light in ultraviolet irradiation device 55, it is known that a high concentration of dissolved oxygen in the water to be treated reduces the TOC removal rate. Accordingly, in the water treatment system shown in FIG. 13, the dissolved oxygen concentration in the inlet water of ultraviolet irradiation device 55 can be lowered and the TOC removal rate in the ultraviolet irradiation device when the dissolved oxygen concentration in the raw water is high can be increased.

FIG. 14 shows yet another example of the water treatment system incorporating the water treatment apparatus according to the present invention. The water treatment system shown in FIG. 14 is configured such that, in the water treatment system shown in FIG. 12, water treatment apparatus 100 according to the present invention is also placed between the outlet of ultraviolet irradiation unit 61 of the subsystem and the inlet of non-regenerative ion exchange device 63. When organic substances in water are decomposed and removed by ultraviolet irradiation, carbonate ions and bicarbonate ions are generated. Since water treatment apparatus 100 can also remove carbonate ions and bicarbonate ions, placing water treatment apparatus 100 as shown in FIG. 12 in the subsystem will reduce the treatment load in non-regenerative ion exchange unit 63 at the subsequent stage and improve the removal performance of impurities.

EXAMPLES

Next, the present invention will be explained in more detail by means of Examples and Comparative Examples.

Example 1

As Example 1, the water treatment apparatus shown in FIG. 1 was assembled. The dimensions of each of anode chamber 21, concentration chambers 22, 24 and cathode chamber 25 were 105 mm×105 mm×9.5 mm, and the dimensions of dissolved oxygen removal chamber 23 were 105 mm×105 mm×19.5 mm. In Example 1, dissolved oxygen removal chamber 23 was filled with a single bed of the Pd-supported anion exchange resin (Pd AER). The size of each of anode 11 and cathode 12 was 105 mm×105 mm, and the current density can be calculated by dividing the applied current by the area of these electrodes.

Example 2

As Example 2, the water treatment apparatus shown in FIG. 3 was assembled. This water treatment apparatus is the same as that in Example 1 in terms of configuration and dimensions, but differs from the one in Example 1 in that dissolved oxygen removal chamber 23 is filled with the Pd-supported anion exchange resin (Pd AER) in a multilayered bed. Specifically, in dissolved oxygen removal chamber 23 in Example 2, a layer of the Pd-supported anion exchange resin (Pd AER) is placed on the inlet side of the water to be treated, and a layer of a cation exchange resin (CER) which does not support a metal catalyst is placed on the outlet side of the water to be treated. The ratio of the flow channel length in the layer of the Pd-supported anion exchange resin to that in the layer of cation exchange resin which does not support a metal catalyst was 1:1.

Comparative Example 1

As Comparative Example 1, the water treatment apparatus shown in FIG. 15 was assembled. This water treatment device is the same as that in Example 1 in terms of configuration and dimensions, but differs from the one in Example 1 in that the Pd-supported anion exchange resin and a cation exchange resin which does not support a metal catalyst were filled in dissolved oxygen removal chamber 23 in a mixed bed configuration. Specifically, in Comparative Example 1, the Pd-supported anion exchange resin and the cation exchange resin not supporting a metal catalyst were mixed at 1:1 in bulk volume and filled into dissolved oxygen removal chamber 23 in their mixed state (Pd AER MB).

For each of the water treatment apparatuses of Examples 1 and 2 and Comparative Example 1, the applied current was varied in the range of 0.5 A to 2.5 A while the water to be treated was passed through at a flow rate of 50 L/h and the supply water at a flow rate of 5 L/h, and these water treatment apparatuses were operated. The dissolved oxygen concentration of the water to be treated at the inlet of cathode chamber 25 and the dissolved oxygen concentration of the treated water discharged from dissolved oxygen removal chamber 23 were examined to determine the change in the dissolved oxygen concentration according to the current density. The results are shown in FIG. 16. Referring to FIG. 16, in Comparative Example 1, in which the packing configuration of the Pd-supported anion exchange resin is a mixed bed configuration, even if the current density increases, the dissolved oxygen removal rate reached a plateau at approximately 70%, but in Example 1 in a single-bed configuration and in Example 2 in a multilayered configuration, the dissolved oxygen removal rate could become 80% or more by increasing the current density. It is also preferred from FIG. 16 to have a current density of 0.45 $A/dm^2$ or more and 2.3 $A/dm^2$ or less to achieve a dissolved oxygen removal rate of at least 20%. More preferably, the current density is set to 1.0 $A/dm^2$ or more and 2.0 $A/dm^2$ or less to obtain a better dissolved oxygen removal rate.

In the water treatment apparatus, when the applied current between anode 11 and cathode 12 is changed, the applied voltage at that time also changes, and the power consumption, which is the product of current and voltage, changes more than the change in the applied current. The power consumption for each of the results shown in FIG. 16 was calculated and converted to power consumption per unit flow rate of the water to be treated, and the results are shown in FIG. 17. In FIG. 17, the horizontal axis is power consumption per unit flow rate of water to be treated, and Comparative Example 1 consumes more power than Examples 1 and 2. Since the applied current is the same in Examples 1 and 2 as in Comparative Example 1, the applied voltage is higher in Comparative Example 1, which is a mixed bed configuration, than in Examples 1 and 2, and the power consumption required to obtain the same dissolved oxygen removal rate is increased in Comparative Example 1. In other words, the single bed configuration represented in Example 1 and the multilayered bed configuration represented in Example 2 can remove dissolved oxygen with energy savings. Upon making the same considerations as for the preferred range of current density, the power consumption per unit flow rate of water to be treated is preferably 0.06 W·h/L or more and 0.70 W·h/L or less, and more preferably 0.17 W·h/L or more and 0.50 W·h/L or less.

Based on the dissolved oxygen concentration of the water to be treated at the inlet of cathode chamber 25 when the results shown in FIG. 16 were obtained and the current value at that time, the relationship between the current value per dissolved oxygen load amount (mass of dissolved oxygen in the water to be treated flowing during unit time) and the dissolved oxygen removal rate was investigated. The results are shown in FIG. 18. From FIG. 18, the current value per dissolved oxygen load amount of 2 mA h/mg is necessary to achieve a dissolved oxygen removal rate of 50% or higher, and 4 mA·h/mg to achieve a dissolved oxygen removal rate of 80% or higher. Therefore, the current value per dissolved oxygen load amount is preferably 2 mA·h/mg or more and 8 mA·h/mg or less, and, more preferably, 4 mA·h/mg or more and 8 mA h/mg or less.

The water treatment apparatuses of Examples 1 and 2 and Comparison Example 1 were operated with the applied current fixed at 2 A, and the changes in the dissolved oxygen removal rate were investigated when the flow rate of the water to be treated was changed. The results are shown in FIG. 19 as a change in the dissolved oxygen removal rate relative to the space velocity based on the volume of the Pd-supported anion exchange resin in dissolved oxygen removal chamber 23. As shown in FIG. 19, the dissolved oxygen removal rate decreased as the flow rate of the water to be treated increased, and in the case of the single bed configuration, the dissolved oxygen removal rate decreased to 50% when the space velocity of the water to be treated based on the volume of the Pd-supported anion exchange resin, that is, the quotient obtained by dividing the flow rate of the water to be treated by the volume of the Pd-supported anion exchange resin, was 500 h$^{-1}$. It is considered that when the flow rate of the water to be treated increases furthermore, the dissolved oxygen removal rate decreases further. It has been found that, for practical purposes, the space velocity of the water to be treated based on the volume of the Pd-loaded anion exchange resin packed in dissolved oxygen removal chamber 23 is preferably 1000 h$^{-1}$ or less, and, more preferably. 500 h$^{-1}$ or less.

Example 3

Water to be treated having dissolved oxygen concentration of 7.9 mg/L and carbonic acid concentration of 3.2 mg/L was used and the water to be treated was supplied to the water treatment apparatus of a single bed configuration of Example 1 at a flow rate of 50 L/h, and the water treatment apparatus was operated with an applied current of 1.0 A. The dissolved oxygen and carbonic acid concentrations in the treated water discharged from dissolved oxygen removal chamber 23 were then measured to determine their respective removal rates. The results are shown in Table 1. From Table 1, it has been found that the water treatment apparatus according to the present invention can remove not only dissolved oxygen but also carbonic acid in water to be treated.

TABLE 1

|  | Water to be treated | Treated water | Removal rate |
|---|---|---|---|
| Dissolved oxygen concentration | 7.9 mg/L | 3.8 mg/L | 51.9% |
| Carbonic acid concentration | 3.2 mg/L | <2 μg/L | >99.9% |

Example 4

Water to be treated having dissolved oxygen concentration of 7.8 mg/L to 8.2 mg/L was used and the water to be treated was supplied to each of the water treatment apparatuses of Examples 1 and 2 and Comparative Example at a flow rate of 50 L/h, and each of the water treatment apparatuses was operated with an applied current of 1.5 A. The hydrogen concentration in the outlet water of cathode chamber 25 and the dissolved oxygen concentration in the treated water discharged from dissolved oxygen removal chamber 23 were measured. From the dissolved oxygen concentration in the treated water, the amount of oxygen removed in dissolved oxygen removal chamber 23 was calculated, and from this and the hydrogen concentration in the outlet water of the cathode chamber, the utilization efficiency of the hydrogen produced in cathode chamber 25 was calculated. For the calculation, one mole of hydrogen (H$_2$) is assumed to react with 0.5 mole of oxygen (O$_2$). The results are shown in Table 2.

TABLE 2

|  | Example 1 (Single bed) | Example 2 (Multilayered bed) | Comparative Exampled 1 (Mixed bed) |
|---|---|---|---|
| Utilization efficiency of hydrogen | 98.5% | 97.7% | 90.5% |

Comparing Example 2 of the multilayered bed configuration with Comparative Example 1 of the mixed bed configuration, the hydrogen utilization efficiency was lower in Comparative Example 1 of the mixed bed configuration, even though the amount of Pd-supported anion exchange resin in dissolved oxygen removal chamber 23 is the same. On the other hand, comparing Example 2 in the multilayered bed configuration with Example 1 in the single bed configuration, there was no significant difference in hydrogen utilization efficiency, even though Example 1 has twice the filling amount of the Pd-supported anion exchange resin in dissolved oxygen removal chamber 23 as that in Example 2. In Examples 1 and 2, almost all of the hydrogen generated in cathode chamber 25 is used to remove dissolved oxygen.

Example 5

The water treatment apparatus shown in FIG. 7 was assembled. The dimensions of each of anode chamber 21, concentration chamber 24 and cathode chamber 25 were 105 mm×105 mm×9.5 mm. Water with a dissolved oxygen concentration of 8.2 mg/L was prepared, and this water was passed through cathode chamber 25 at 50 L/h as the water to be treated and through concentration chamber 24 at 5 L/h as the supply water. The water treatment apparatus was operated by varying the value of the current flowing between anode 11 and cathode 12 in the range of 0.5 A to 2.5 A. The dissolved oxygen concentration of the treated water discharged from cathode chamber 25 was measured to determine the dissolved oxygen removal rate. The results are shown in FIG. 20. From FIG. 20, it has been found that there is a correlation between the current value and the dissolved oxygen removal rate, and that the dissolved oxygen removal rate can be improved by increasing the current density. This means that the hydrogen generated in cathode chamber 25 could be effectively used to remove dissolved oxygen.

Example 6

The experiment was conducted in the same manner as in Example 1 except for using the same apparatus as in Example 5, adding hydrogen peroxide to the water to be treated and setting the current during operation to 1.5 A, and the hydrogen peroxide concentration in the treated water was measured to determine the hydrogen peroxide removal rate. The results are shown in Table 3.

TABLE 3

| Hydrogen peroxide concentration [mg/L] | | Hydrogen |
| --- | --- | --- |
| Water to be treated (Inlet) | Treated water (Outlet) | peroxide removal rate [%] |
| 0.33 | 0.044 | 86.7 |
| 0.56 | 0.060 | 89.3 |
| 0.98 | 0.103 | 89.5 |

From the results in Table 3, it is found that hydrogen peroxide can also be removed when cathode chamber 25 is filled with the Pd-supported anion exchange resin. The dissolved oxygen removal rate at this time was measured to be about 27%, which is similar to the dissolved oxygen removal rate in Example 5.

REFERENCE SIGNS LIST

11 Anode;
12 Cathode;
21 Anode chamber;
22, 24 Concentration chamber;
23 Deionization chamber,
25 Cathode chamber,
26 Dissolved oxygen removal chamber,
31, 33, 35 Cation exchange membrane;
32, 34, 36 Anion exchange membrane; and
100 Water treatment apparatus.

The invention claimed is:

1. A water treatment method for removing at least dissolved oxygen contained in water to be treated, comprising:
applying a DC current between an anode and a cathode; and
passing the water to be treated through a dissolved oxygen removal chamber, which is located between the anode and the cathode and filled with an ion exchanger in a multilayered bed configuration,
wherein at least a portion of the ion exchanger filled in the dissolved oxygen removal chamber is an anion exchanger on which a metal catalyst is supported, and
wherein the anion exchanger on which the metal catalyst is supported is filled in a single bed configuration only in an upstream side of flow in the dissolved oxygen removal chamber.

2. The water treatment method according to claim 1, wherein the water to be treated is supplied to a cathode chamber in which the cathode is provided, and the water to be treated,
which has passed through the cathode chamber, is then passed through the dissolved oxygen removal chamber.

3. A water treatment method for removing dissolved oxygen and hydrogen peroxide contained in water to be treated, comprising:
applying a DC current between an anode provided in an anode chamber and a cathode provided in a cathode chamber which is filled with an ion exchanger; and
passing the water to be treated through the cathode chamber,
wherein the cathode chamber is defined by a first ion exchange membrane on a side thereof facing the anode chamber,
wherein the anode chamber is defined by a second ion exchange membrane on a side thereof facing the cathode chamber,
wherein at least a portion of the ion exchanger filled in the cathode chamber is an ion exchanger on which a metal catalyst is supported, and
at least one of a concentration chamber and a deionization chamber is arranged between the anode chamber and the cathode chamber.

4. The water treatment method according to claim 3, wherein the first ion exchange membrane defining the cathode chamber is an anion exchange membrane and the ion exchanger filled in the cathode chamber is an anion exchanger.

5. The water treatment method according to claim 3, further comprising deionizing the water to be treated by passing the water to be treated, which has passed through the cathode chamber, through a deionization chamber which is located between the anode chamber and the cathode chamber, defined by the first and second ion exchange membranes and filled with an ion exchanger.

6. The water treatment method according to claim 1, wherein the metal catalyst is a platinum group metal catalyst and hydrogen peroxide is removed in addition to dissolved oxygen in the water to be treated.

7. A water treatment apparatus for removing at least dissolved oxygen contained in water to be treated, comprising:
an anode and a cathode; and
a dissolved oxygen removal chamber which is located between the anode and the cathode and filled with an ion exchanger in a multilayered bed configuration, and through which the water to be treated passes,
wherein at least a portion of the ion exchanger filled in the dissolved oxygen removal chamber is an anion exchanger on which a metal catalyst is supported,
wherein the anion exchanger on which the metal catalyst is supported is filled in a single bed configuration only in an upstream side of flow in the dissolved oxygen removal chamber, and
wherein a DC current is applied between the anode and the cathode.

8. The water treatment apparatus according to claim 7, wherein the dissolved oxygen removal chamber is defined by one or more of an electrode plate that is the anode, an electrode plate that is the cathode, and an ion exchange membrane.

9. The water treatment apparatus according to claim 7, wherein the dissolved oxygen removal chamber is a cathode chamber provided with the cathode or is connected in series with the cathode chamber with respect to a flow of the water to be treated.

10. The water treatment apparatus according to claim 7, wherein a means for supplying hydrogen to the water to be treated is provided upstream of the dissolved oxygen removal chamber.

11. The water treatment apparatus according to claim 7, wherein a current value of the DC current for a load amount of dissolved oxygen to be treated in the water to be treated is set to 2 mA·h/mg or more and 8 mA·h/mg or less.

12. The water treatment apparatus according to claim 7, wherein a space velocity of the water to be treated is set to 1000 h$^{-1}$ or less by using, as a basis, a volume of the ion exchanger on which the metal catalyst is supported and which filled in the dissolved oxygen removal chamber.

13. The water treatment apparatus according to claim 7, wherein an amount of hydrogen contained in the water to be treated which is supplied to the dissolved oxygen removal chamber is adjusted so that a mass ratio of an amount of hydrogen supplied to the dissolved oxygen removal chamber per unit time to a load amount of dissolved oxygen load amount to be treated in the water to be treated is 0.1 or more and 0.4 or less.

14. The water treatment apparatus according to claim 7, wherein a current density in the dissolved oxygen removal chamber is 0.45 A/dm$^2$ or more and 2.3 A/dm$^2$ or less.

15. The water treatment apparatus according to claim 7, wherein a power consumption per flow rate of the water to be treated in the dissolved oxygen removal chamber is 0.06 W·h/L or more and 0.70 W·h/L or less.

16. A water treatment apparatus which removes dissolved oxygen and hydrogen peroxide contained in water to be treated, comprising:

an anode chamber equipped with an anode;

a cathode chamber equipped with a cathode, filled with ion exchanger, and supplied with the water to be treated; and at least one of a concentration chamber and a deionization chamber arranged between the anode chamber and the cathode chamber, wherein the cathode chamber is defined by a first ion exchange membrane on a side thereof facing the anode chamber, wherein the anode chamber is defined by a second ion exchange membrane on a side thereof facing the cathode chamber, wherein at least a portion of the ion exchanger filled in the cathode chamber is an ion exchanger on which a metal catalyst is supported, and wherein a DC current is applied between the anode and the cathode.

17. The water treatment apparatus according to claim 16, wherein the first ion exchange membrane defining the cathode chamber is an anion exchange membrane and the ion exchanger filled in the cathode chamber is an anion exchanger.

18. The water treatment method according to claim 3, wherein the metal catalyst is a platinum group metal catalyst and hydrogen peroxide is removed in addition to dissolved oxygen in the water to be treated.

* * * * *